(12) United States Patent
Ozawa et al.

(10) Patent No.: US 8,134,592 B2
(45) Date of Patent: Mar. 13, 2012

(54) ASSOCIATING DEVICE

(75) Inventors: Yuka Ozawa, Tokyo (JP); Mitsuhiro Kageyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 971 days.

(21) Appl. No.: 12/093,877

(22) PCT Filed: Nov. 16, 2006

(86) PCT No.: PCT/JP2006/322880
§ 371 (c)(1),
(2), (4) Date: May 15, 2008

(87) PCT Pub. No.: WO2007/058268
PCT Pub. Date: May 24, 2007

(65) Prior Publication Data
US 2009/0268017 A1    Oct. 29, 2009

(30) Foreign Application Priority Data
Nov. 16, 2005    (JP) .................................. 2005-331694

(51) Int. Cl.
*H03M 7/00* (2006.01)
(52) U.S. Cl. ........................................................ 348/61
(58) Field of Classification Search ...................... 348/61
See application file for complete search history.

(56) References Cited

U.S. PATENT DOCUMENTS

| | | | | |
|---|---|---|---|---|
| 5,717,468 | A * | 2/1998 | Baryla | 725/37 |
| 6,360,057 | B1 * | 3/2002 | Tsumagari et al. | 386/241 |
| 6,937,295 | B2 * | 8/2005 | Islam et al. | 348/722 |
| 6,988,245 | B2 * | 1/2006 | Janevski | 715/723 |

FOREIGN PATENT DOCUMENTS

| | | |
|---|---|---|
| JP | 08-185452 | 7/1996 |
| JP | 09-198396 | 7/1997 |
| JP | 10-042177 | 2/1998 |
| JP | 2001-282813 | 10/2001 |
| JP | 2002-082684 | 3/2002 |
| JP | 2002-092032 | 3/2002 |
| JP | 2003-339006 | 11/2003 |

OTHER PUBLICATIONS

International search report dated Feb. 20, 2007.

* cited by examiner

*Primary Examiner* — Jerry Dennison
(74) *Attorney, Agent, or Firm* — Pearne & Gordon LLP

(57) ABSTRACT

An object of the invention is to make it possible to input memo information for each video material without being conscious of the association with the video material. The associating device according to the invention includes an association determination section 40 for associating a word with a video material by using the input start time information on an inputted word and the photography time information on a photographed video material.

9 Claims, 51 Drawing Sheets

*FIG. 4*

SHOSAINOYOUSU (APPEARANCE OF READING ROOM)
SHOUMEINASHI (NO ILLUMINATION)
USUGURAI (DARKISH)
NARE-SHONSOUNYUU (INSERT NARRATION)
○
INTABYU- (INTERVIEW)
KOUHAN (LAST HALF)
◎
GYOKOUTOKAMOME (FISHERY HARBOR AND SEA GULL)
ODAYAKANAUMI (CALM SEA)
GYOSEN (FISHING BOAT)
MOKUZOUKYUUKA (WOODEN OLD HOUSE)
O-PUNINGU (OPENING)
ROJIURA (ALLEY)
TEROPPU (TELOP)
TEBURENG (SHAKING NG)

FIG. 5

| OPERATION | CHARACTER STRING | OPERATION START TIME | OPERATION END TIME | ROW | COLUMN |
|---|---|---|---|---|---|
| INPUT | HEYA | 13:01 | 13:01 | 1 | 1 |
| INPUT | NO | 13:01 | 13:01 | 1 | 3 |
| INPUT | YOUSU ↵ | 13:02 | 13:02 | 1 | 4 |
| INPUT | SHOUMEI | 13:12 | 13:12 | 2 | 1 |
| INPUT | NASHI ↵ | 13:13 | 13:13 | 2 | 3 |
| INPUT | NARE-SHON | 13:20 | 13:20 | 3 | 1 |
| INPUT | SOUNYUU ↵ | 13:21 | 13:21 | 3 | 7 |
| DELETION | YA | - | 13:22 | 1 | 2 |
| DELETION | HE | - | 13:22 | 1 | 1 |
| INPUT | SHOSAI | 13:22 | 13:22 | 4 | 1 |
| INPUT | ○ ↵ | 13:32 | 13:32 | 5 | 1 |
| INPUT | INTABYU- ↵ | 13:42 | 13:43 | 5 | 1 |
| INPUT | KOUHAN ↵ | 13:45 | 13:45 | 6 | 1 |
| INPUT | ◎ ↵ | 13:46 | 13:46 | 7 | 1 |

| OPERATION | CHARACTER STRING | OPERATION START TIME | OPERATION END TIME | ROW | COLUMN |
|---|---|---|---|---|---|
| INPUT | GYOKOU ↵ | 13:55 | 13:56 | 8 | 1 |
| INPUT | ODAYAKANA | 14:07 | 14:07 | 9 | 1 |
| INPUT | UMI ↵ | 14:08 | 14:08 | 9 | 5 |
| INPUT | GYOSEN ↵ | 14:10 | 14:11 | 10 | 1 |
| INPUT | MACHINAMI ↵ | 14:17 | 14:18 | 11 | 1 |
| INPUT | O-PUNINGU ↵ | 14:22 | 14:23 | 12 | 1 |
| DELETION | MI | - | 14:23 | 11 | 3 |
| DELETION | NAMI | - | 14:23 | 11 | 2 |
| DELETION | MACHI | - | 14:23 | 11 | 1 |
| INPUT | MOKUZOUKYUUKA ↵ | 14:23 | 14:23 | 11 | 1 |
| INPUT | ROJIURA ↵ | 14:28 | 14:29 | 13 | 5 |
| INPUT | USUGURAI | 20:15 | 20:15 | 2 | 1 |
| INPUT | TEROPPU ↵ | 20:33 | 20:33 | 14 | 3 |
| INPUT | TOKAMOME | 20:52 | 20:52 | 11 | 1 |
| INPUT | TEBURE | 21:33 | 21:34 | 15 | 4 |
| INPUT | NG | 21:34 | 21:34 | 15 | ·· |
| ·· | ·· | ·· | ·· | ·· | ·· |

FIG. 6

| PROPERTY | VALUE |
|---|---|
| CLIPNAME | CUT A |
| TYPE | MOVIE FILE (MPEG) |
| SIZE | 50960256 BYTES |
| CREATION DATE | NOVEMBER 9, 2005 13:00:00 |
| LENGTH | 00:10:00 |

FIG. 7

| TARGET CUT | START TIME | END TIME |
|---|---|---|
| CUT A | 13:00 | 13:10 |
| CUT B | 13:30 | 13:40 |
| CUT C | 14:00 | 14:05 |
| CUT D | 14:15 | 14:20 |
| CUT E | 14:30 | 14:35 |

FIG. 8

| OPERATION | TARGET CUT | TIME |
|---|---|---|
| REPRODUCTION | CUT A | 20:10 |
| REPRODUCTION END | - | 20:20 |
| REPRODUCTION | CUT B | 20:20 |
| FAST-FORWARD | - | 20:22 |
| FAST-FORWARD END | - | 20:23 |
| REPRODUCTION END | - | 20:27 |
| REPRODUCTION | CUT D | 21:45 |
| REPRODUCTION END | - | 21:50 |
| REPRODUCTION | CUT C | 20:50 |
| PAUSE | - | 20:52 |
| PAUSE END | - | 20:55 |
| REPRODUCTION END | - | 20:58 |
| REPRODUCTION | CUT D | 21:15 |
| REPRODUCTION END | - | 21:20 |
| REPRODUCTION | CUT E | 21:30 |
| REPRODUCTION END | - | 21:35 |

FIG. 9

| OPERATION | TARGET CUT | START TIME | END TIME |
|---|---|---|---|
| PHOTOGRAPHY | CUT A | 13:00 | 13:10 |
| PHOTOGRAPHY | CUT B | 13:30 | 13:40 |
| PHOTOGRAPHY | CUT C | 14:00 | 14:05 |
| PHOTOGRAPHY | CUT D | 14:15 | 14:20 |
| PHOTOGRAPHY | CUT E | 14:30 | 14:35 |
| REPRODUCTION CONFIRMATION | CUT A | 20:10 | 20:20 |
| REPRODUCTION CONFIRMATION | CUT B | 20:20 | 20:27 |
| REPRODUCTION CONFIRMATION | CUT D | 21:45 | 21:50 |
| REPRODUCTION CONFIRMATION | CUT C | 20:50 | 20:58 |
| REPRODUCTION CONFIRMATION | CUT D | 21:15 | 21:20 |
| REPRODUCTION CONFIRMATION | CUT E | 21:30 | 21:35 |

FIG. 11

| OPERATION | CHARACTER STRING | OPERATION START TIME | OPERATION END TIME | ROW | COLUMN |
|---|---|---|---|---|---|
| INPUT | HEYA | 13:01 | 13:01 | 1 | 1 |
| INPUT | NO | 13:01 | 13:01 | 1 | 3 |
| INPUT | YOUSU ↵ | 13:02 | 13:02 | 1 | 4 |
| INPUT | SHOUMEI | 13:12 | 13:12 | 2 | 1 |
| INPUT | NASHI ↵ | 13:13 | 13:13 | 2 | 3 |
| INPUT | NARE-SHON | 13:20 | 13:20 | 3 | 1 |

FIG. 12

| OPERATION | CHARACTER STRING | OPERATION START TIME | OPERATION END TIME | ROW | COLUMN |
|---|---|---|---|---|---|
| INPUT | HEYA | 13:01 | 13:01 | 1 | 1 |
| INPUT | NO | 13:01 | 13:01 | 1 | 3 |
| INPUT | YOUSU ↵ | 13:02 | 13:02 | 1 | 4 |
| INPUT | SHOUMEI | 13:12 | 13:12 | 2 | 1 |
| INPUT | NASHI ↵ | 13:13 | 13:13 | 2 | 3 |
| INPUT | NARE-SHON | 13:20 | 13:20 | 3 | 1 |
| INPUT | SOUNYUU ↵ | 13:21 | 13:21 | 3 | 7 |

FIG. 13

| OPERATION | CHARACTER STRING | OPERATION START TIME | OPERATION END TIME | ROW | COLUMN |
|---|---|---|---|---|---|
| INPUT |  | 13:01 | 13:01 | 1 | 1 |
| INPUT | NO | 13:01 | 13:01 | 1 | 1 |
| INPUT | YOUSU ⏎ | 13:02 | 13:02 | 1 | 2 |
| INPUT | SHOUMEI | 13:12 | 13:12 | 2 | 1 |
| INPUT | NASHI ⏎ | 13:13 | 13:13 | 2 | 3 |
| INPUT | NARE-SHON | 13:20 | 13:20 | 3 | 1 |
| INPUT | SOUNYUU ⏎ | 13:21 | 13:21 | 3 | 7 |

FIG. 14

| OPERATION | CHARACTER STRING | OPERATION START TIME | OPERATION END TIME | ROW | COLUMN |
|---|---|---|---|---|---|
| INPUT | SHOSAI | 13:01 | 13:01 | 1 | 1 |
| INPUT | NO | 13:01 | 13:01 | 1 | 3 |
| INPUT | YOUSU ⏎ | 13:02 | 13:02 | 1 | 4 |
| INPUT | SHOUMEI | 13:12 | 13:12 | 2 | 1 |
| INPUT | NASHI ⏎ | 13:13 | 13:13 | 2 | 3 |
| INPUT | NARE-SHON | 13:20 | 13:20 | 3 | 1 |
| INPUT | SOUNYUU ⏎ | 13:21 | 13:21 | 3 | 7 |

FIG. 15

| CHARACTER STRING | INPUT START TIME | INPUT END TIME |
|---|---|---|
| SHOSAI | 13:01 | 13:01 |
| NO | 13:01 | 13:01 |
| YOUSU ↵ | 13:02 | 13:02 |
| SHOUMEI | 13:12 | 13:12 |
| NASHI | 13:12 | 13:13 |
| USUGURAI ↵ | 20:15 | 20:15 |
| NARE-SHON | 13:20 | 13:20 |
| SOUNYUU ↵ | 13:21 | 13:21 |
| ○ ↵ | 13:32 | 13:33 |
| INTABYU- ↵ | 13:42 | 13:43 |
| KOUHAN ↵ | 13:45 | 13:45 |
| ◎ ↵ | 13:46 | 13:46 |
| GYOKOUTOKAMOME ↵ | 13:55 | 13:56 |
| ODAYAKANA | 14:07 | 14:07 |
| UMI ↵ | 14:08 | 14:08 |
| GYOSEN ↵ | 14:10 | 14:11 |
| MOKUZOUKYUUKA ↵ | 14:17 | 14:18 |
| O-PUNINGU ↵ | 14:22 | 14:23 |
| ROJIURA ↵ | 14:28 | 14:29 |
| TEROPPU ↵ | 20:33 | 20:33 |
| TEBURE | 21:33 | 21:34 |
| NG ↵ | 21:34 | 21:34 |

FIG. 18

| | INPUT START TIME | INPUT END TIME |
|---|---|---|
| SHOSAINOYOUSU | 13:01 | 13:02 |
| SHOUMEINASHI | 13:12 | 13:14 |
| USUGURAI | 20:15 | 20:15 |
| NARE-SHONSOUNYUU | 13:20 | 13:22 |
| ○ | 13:32 | 13:33 |
| INTABYU- | 13:42 | 13:43 |
| KOUHAN ◎ | 13:45 | 13:46 |
| GYOKOUTOKAMOME | 13:55 | 13:56 |
| ODAYAKANAUMI | 14:04 | 14:06 |
| GYOSEN | 14:07 | 14:08 |
| MOKUZOUKYUUKA | 14:17 | 14:18 |
| O-PUNINGU | 14:22 | 14:23 |
| ROJIURA | 14:28 | 14:29 |
| TEROPPU | 20:23 | 20:23 |
| TEBURENG | 21:33 | 21:34 |

FIG. 22

| | INPUT START TIME | INPUT END TIME | ASSOCIATION CANDIDATE |
|---|---|---|---|
| SHOSAINOYOUSU | 13:01 | 13:02 | CUT A |
| SHOUMEINASHI | 13:12 | 13:14 | CUT A |
| USUGURAI | 20:15 | 20:15 | CUT E |
| NARE-SHONSOUNYUU | 13:20 | 13:22 | CUT A, CUT B |
| ○ | 13:32 | 13:33 | CUT B |
| INTABYU- | 13:42 | 13:43 | CUT B |
| KOUHAN ◎ | 13:45 | 13:46 | CUT B |
| GYOKOUTOKAMOME | 13:55 | 13:56 | CUT B, CUT C |
| ODAYAKANAUMI | 14:04 | 14:06 | CUT C |
| GYOSEN | 14:07 | 14:08 | CUT C |
| MOKUZOUKYUUKA | 14:17 | 14:18 | CUT D |
| O-PUNINGU | 14:22 | 14:23 | CUT D |
| ROJIURA | 14:28 | 14:29 | CUT D, CUT E |
| TEROPPU | 20:23 | 20:23 | CUT E |
| TEBURENG | 21:33 | 21:34 | CUT E |

FIG. 24

|  | INPUT START TIME | INPUT END TIME | ASSOCIATION CANDIDATE |
|---|---|---|---|
| SHOSAINOYOUSU | 13:01 | 13:02 | - |
| SHOUMEINASHI | 13:12 | 13:14 | - |
| USUGURAI | 20:15 | 20:15 | CUT A |
| NARE-SHONSOUNYUU | 13:20 | 13:22 | - |
| ◯ | 13:32 | 13:33 | - |
| INTABYU- | 13:42 | 13:43 | - |
| KOUHAN ◎ | 13:45 | 13:46 | - |
| GYOKOUTOKAMOME | 13:55 | 13:56 | - |
| ODAYAKANAUMI | 14:04 | 14:06 | - |
| GYOSEN | 14:07 | 14:08 | - |
| MOKUZOUKYUUKA | 14:17 | 14:18 | - |
| O-PUNINGU | 14:22 | 14:23 | - |
| ROJIURA | 14:28 | 14:29 | - |
| TEROPPU | 20:23 | 20:23 | CUT B |
| TEBURENG | 21:33 | 21:34 | CUT E |

FIG. 25

| | INPUT START TIME | INPUT END TIME | ASSOCIATION CANDIDATE |
|---|---|---|---|
| SHOSAINOYOUSU | 13:01 | 13:02 | CUT A |
| SHOUMEINASHI | 13:12 | 13:14 | CUT A |
| USUGURAI | 20:15 | 20:15 | CUT A |
| NARE-SHONSOUNYUU | 13:20 | 13:22 | CUT A, CUT B |
| ○ | 13:32 | 13:33 | CUT B |
| INTABYU- | 13:42 | 13:43 | CUT B |
| KOUHAN ◎ | 13:45 | 13:46 | CUT B |
| GYOKOUTOKAMOME | 13:55 | 13:56 | CUT B, CUT C |
| ODAYAKANAUMI | 14:04 | 14:06 | CUT C |
| GYOSEN | 14:07 | 14:08 | CUT C |
| MOKUZOUKYUUKA | 14:17 | NTH CUT | CUT D |
| O-PUNINGU | 14:22 | 14:23 | CUT D |
| ROJIURA | 14:28 | 14:29 | CUT D, CUT E |
| TEROPPU | 20:23 | 20:23 | CUT B |
| TEBURENG | 21:33 | 21:34 | CUT E |

*FIG. 26*

| CUT A | CUT B | CUT C | CUT D |
|---|---|---|---|
| SHOSAINOYOUSU<br>SHOUMEINASHI<br>USUGURAI<br>NARE-SHONSOUNYUU | NARE-SHONSOUNYUU<br>○<br>INTABYU-<br>KOUHAN ⊚<br>GYOKOUTOKAMOME<br>TEROPPU | GYOKOUTOKAMOME<br>ODAYAKANAUMI<br>GYOSEN | MOKUZOUKYUUKA<br>O-PUNINGU<br>ROJIURA |

| CUT E |
|---|
| ROJIURA<br>TEBURENG |

FIG. 29

```
SHOSAINOYOUSU
SHOUMEINASHI
USUGURAI
NARE-SHONSOUNYUU
○
INTABYU-
KOUHAN
◎
GYOKOUTOKAMOME
ODAYAKANAUMI
GYOSEN
MOKUZOUKYUUKA
O-PUNINGU
ROJIURA
TEROPPU
TEBURENG
```

FIG. 31

| OPERATION | CHARACTER STRING | OPERATION START TIME | OPERATION END TIME | ROW | COLUMN |
|---|---|---|---|---|---|
| INPUT | HEYA | 13:01 | 13:01 | 1 | 1 |
| INPUT | NO | 13:01 | 13:01 | 1 | 3 |
| INPUT | YOUSU ↵ | 13:02 | 13:02 | 1 | 4 |
| INPUT | SHOUMEI | 13:12 | 13:12 | 2 | 1 |
| INPUT | NASHI ↵ | 13:13 | 13:13 | 2 | 3 |
| INPUT | NARE-SHON | 13:20 | 13:20 | 3 | 1 |
| INPUT | SOUNYUU ↵ | 13:21 | 13:21 | 3 | 7 |
| DELETION | YA | - | 13:22 | 1 | 2 |
| DELETION | HE | - | 13:22 | 1 | 1 |
| INPUT | SHOSAI | 13:22 | 13:22 | 1 | 1 |
| INPUT | O ↵ | 13:32 | 13:32 | 4 | 1 |
| INPUT | INTABYU- | 13:42 | 13:43 | 5 | 1 |
| INPUT | KOUHAN ↵ | 13:45 | 13:45 | 6 | 1 |
| INPUT | ◎ ↵ | 13:46 | 13:46 | 7 | 1 |

| OPERATION | CHARACTER STRING | OPERATION START TIME | OPERATION END TIME | ROW | COLUMN |
|---|---|---|---|---|---|
| INPUT | GYOKOU ↵ | 13:55 | 13:56 | 8 | 1 |
| INPUT | ODAYAKANA | 14:07 | 14:07 | 9 | 1 |
| INPUT | UMI ↵ | 14:08 | 14:08 | 9 | 5 |
| INPUT | GYOSEN ↵ | 14:10 | 14:11 | 10 | 1 |
| INPUT | MACHINAMI ↵ | 14:17 | 14:18 | 11 | 1 |
| INPUT | O-PUNINGU ↵ | 14:22 | 14:23 | 12 | 1 |
| DELETION | MI | - | 14:23 | 11 | 3 |
| DELETION | NAMI | - | 14:23 | 11 | 2 |
| DELETION | MACHI | - | 14:23 | 11 | 1 |
| INPUT | MOKUZOUKYUUKA ↵ | 14:23 | 14:23 | 11 | 1 |
| INPUT | ROJIURA ↵ | 14:28 | 14:29 | 13 | 1 |
| INPUT | USUGURAI | 20:15 | 20:15 | 2 | 5 |
| INPUT | TEROPPU ↵ | 20:33 | 20:33 | 14 | 1 |
| INPUT | TOKAMOME ↵ | 20:52 | 20:52 | 11 | 3 |
| INPUT | TEBURE | 21:33 | 21:34 | 15 | 1 |
| INPUT | NG | 21:34 | 21:34 | 15 | 4 |
| ･･ | ･･ | ･･ | ･･ | ･･ | ･･ |

FIG. 32

| OPERATION | TARGET CUT | START TIME | END TIME |
|---|---|---|---|
| PHOTOGRAPHY | CUT A | 13:00 | 13:10 |
| PHOTOGRAPHY | CUT B | 13:30 | 13:40 |
| PHOTOGRAPHY | CUT C | 14:00 | 14:05 |
| PHOTOGRAPHY | CUT D | 14:15 | 14:20 |
| PHOTOGRAPHY | CUT E | 14:30 | 14:35 |
| REPRODUCTION | CUT A | 20:10 | 20:20 |
| REPRODUCTION | CUT B | 20:20 | 20:22 |
| FAST-FORWARD | CUT B | 20:22 | 20:23 |
| REPRODUCTION | CUT B | 20:23 | 20:27 |
| REPRODUCTION | CUT D | 21:45 | 21:50 |
| REPRODUCTION | CUT C | 20:50 | 20:52 |
| PAUSE | CUT C | 20:52 | 20:55 |
| REPRODUCTION | CUT C | 20:55 | 20:58 |
| REPRODUCTION | CUT D | 21:15 | 21:20 |
| REPRODUCTION | CUT E | 21:30 | 21:35 |

FIG. 33

| OPERATION | TARGET CUT | START TIME | END TIME |
|---|---|---|---|
| PHOTOGRAPHY | CUT A | 13:00 | 13:10 |
| PHOTOGRAPHY | CUT B | 13:30 | 13:40 |
| PHOTOGRAPHY | CUT C | 14:00 | 14:05 |
| PHOTOGRAPHY | CUT D | 14:15 | 14:20 |
| PHOTOGRAPHY | CUT E | 14:30 | 14:35 |
| REPRODUCTION CONFIRMATION | CUT A | 20:10 | 20:20 |
| REPRODUCTION CONFIRMATION | CUT B | 20:20 | 20:27 |
| REPRODUCTION CONFIRMATION | CUT D | 21:45 | 21:50 |
| REPRODUCTION CONFIRMATION | CUT C | 20:50 | 20:58 |
| REPRODUCTION | CUT D | 21:15 | 21:20 |
| REPRODUCTION CONFIRMATION | CUT E | 21:30 | 21:35 |

FIG. 35

| CHARACTER STRING | INPUT START TIME | INPUT END TIME | EDIT TIME |
|---|---|---|---|
| SHOSAI | 13:01 | 13:01 | 13:22 |
| NO | 13:01 | 13:01 | - |
| YOUSU ↵ | 13:02 | 13:02 | - |
| SHOUMEI | 13:12 | 13:12 | - |
| NASHI | 13:12 | 13:13 | - |
| USUGURAI ↵ | 20:15 | 20:15 | - |
| NARE-SHON | 13:20 | 13:20 | - |
| SOUNYUU ↵ | 13:21 | 13:21 | - |
| ○ ↵ | 13:32 | 13:33 | - |
| INTABYU- ↵ | 13:42 | 13:43 | - |
| KOUHAN ↵ | 13:45 | 13:45 | - |
| ◎ ↵ | 13:46 | 13:46 | - |
| GYOKOUTOKAMOME ↵ | 13:55 | 13:56 | 20:52 |
| ODAYAKANA | 14:07 | 14:07 | - |
| UMI ↵ | 14:08 | 14:08 | - |
| GYOSEN ↵ | 14:10 | 14:11 | - |
| MOKUZOUKYUUKA ↵ | 14:17 | 14:18 | 14:23 |
| O-PUNINGU ↵ | 14:22 | 14:23 | - |
| ROJIURA ↵ | 14:28 | 14:29 | - |
| TEROPPU ↵ | 20:23 | 20:33 | - |
| TEBURENG ↵ | 21:33 | 21:34 | |

FIG. 36

|  | INPUT START TIME | INPUT END TIME | EDIT TIME |
|---|---|---|---|
| SHOSAINOYOUSU | 13:01 | 13:02 | 13:22 |
| SHOUMEINASHI | 13:12 | 13:14 | - |
| USUGURAI | 20:15 | 20:15 | - |
| NARE-SHONSOUNYUU | 13:20 | 13:22 | - |
| ◯ | 13:32 | 13:33 | - |
| INTABYU- | 13:42 | 13:43 | - |
| KOUHAN ◎ | 13:45 | 13:46 | - |
| GYOKOUTOKAMOME | 13:55 | 13:56 | 20:52 |
| ODAYAKANAUMI | 14:04 | 14:06 | - |
| GYOSEN | 14:07 | 14:08 | - |
| MOKUZOUKYUUKA | 14:17 | 14:18 | 14:23 |
| O-PUNINGU | 14:22 | 14:23 | - |
| ROJIURA | 14:28 | 14:29 | - |
| TEROPPU | 20:23 | 20:23 | - |
| TEBURENG | 21:33 | 21:34 | - |

FIG. 38

| NO | CHARACTER STRING | INPUT START TIME | INPUT END TIME | EDIT TIME | RELATIONSHIP HIGH |
|---|---|---|---|---|---|
| 1 | SHOSAINOYOUSU | 13:01 | 13:02 | 13:22 | 4 |
| 2 | SHOUMEINASHI | 13:12 | 13:14 | – | – |
| 3 | USUGURAI | 20:15 | 20:15 | – | – |
| 4 | NARE-SHONSOUNYUU | 13:20 | 13:22 | – | 1 |
| 5 | ○ | 13:32 | 13:33 | – | – |
| 6 | INTABYU- | 13:42 | 13:43 | – | – |
| 7 | KOUHAN ◎ | 13:45 | 13:46 | – | – |
| 8 | GYOKOUTOKAMOME | 13:55 | 13:56 | 20:52 | – |
| 9 | ODAYAKANAUMI | 14:04 | 14:06 | – | – |
| 10 | GYOSEN | 14:07 | 14:08 | – | – |
| 11 | MOKUZOUKYUUKA | 14:17 | 14:18 | 14:23 | 12 |
| 12 | O-PUNINGU | 14:22 | 14:23 | – | 11 |
| 13 | ROJIURA | 14:28 | 14:29 | – | – |
| 14 | TEROPPU | 20:23 | 20:23 | – | – |
| 15 | TEBURENG | 21:33 | 21:34 | – | – |

FIG. 41

| | INPUT START TIME | INPUT END TIME | EDIT TIME | ASSOCIATION CANDIDATE BY PHOTOGRAPHY TIME |
|---|---|---|---|---|
| SHOSAINOYOUSU | 13:01 | 13:02 | 13:22 | CUT A |
| SHOUMEINASHI | 13:12 | 13:14 | - | CUT A |
| USUGURAI | 20:15 | 20:15 | - | CUT E |
| NARE-SHONSOUNYUU | 13:20 | 13:22 | - | CUT A, CUT B |
| ○ | 13:32 | 13:33 | - | CUT B |
| INTABYU- | 13:42 | 13:43 | - | CUT B |
| KOUHAN ◎ | 13:45 | 13:46 | - | CUT B |
| GYOKOUTOKAMOME | 13:55 | 13:56 | 20:52 | CUT B, CUT C |
| ODAYAKANAUMI | 14:04 | 14:06 | - | CUT C |
| GYOSEN | 14:07 | 14:08 | - | CUT C |
| MOKUZOUKYUUKA | 14:17 | 14:18 | 14:23 | CUT D |
| O-PUNINGU | 14:22 | 14:23 | - | CUT D |
| ROJIURA | 14:28 | 14:29 | - | CUT D, CUT E |
| TEROPPU | 20:23 | 20:23 | - | CUT E |
| TEBURENG | 21:33 | 21:34 | - | CUT E |

FIG. 43

| | INPUT START TIME | INPUT END TIME | ASSOCIATION CANDIDATE BY RECORDING TIME | ASSOCIATION CANDIDATE BY REPRODUCTION TIME |
|---|---|---|---|---|
| SHOSAINOYOUSU | 13:01 | 13:02 | CUT A | - |
| SHOUMEINASHI | 13:12 | 13:14 | CUT A | - |
| USUGURAI | 20:15 | 20:15 | - | CUT A |
| NARE-SHONSOUNYUU | 13:20 | 13:22 | CUT A, CUT B | - |
| ○ | 13:32 | 13:33 | CUT B | - |
| INTABYU- | 13:42 | 13:43 | CUT B | - |
| KOUHAN ◎ | 13:45 | 13:46 | CUT B | - |
| GYOKOUTOKAMOME | 13:55 | 13:56 | CUT C | CUT C |
| ODAYAKANAUMI | 14:04 | 14:06 | CUT C | - |
| GYOSEN | 14:07 | 14:08 | CUT C | - |
| MOKUZOUKYUUKA | 14:17 | 14:18 | CUT D | - |
| O-PUNINGU | 14:22 | 14:23 | CUT D | - |
| ROJIURA | 14:28 | 14:29 | CUT D, CUT E | - |
| TEROPPU | 20:23 | 20:23 | - | CUT B |
| TEBURENG | 21:33 | 21:34 | - | CUT E |

FIG. 44

| | INPUT START TIME | INPUT END TIME | ASSOCIATION CANDIDATE |
|---|---|---|---|
| SHOSAINOYOUSU | 13:01 | 13:02 | CUT A |
| SHOUMEINASHI | 13:12 | 13:14 | CUT A |
| USUGURAI | 20:15 | 20:15 | CUT A |
| NARE-SHONSOUNYUU | 13:20 | 13:22 | CUT A, CUT B |
| ○ | 13:32 | 13:33 | CUT B |
| INTABYU- | 13:42 | 13:43 | CUT B |
| KOUHAN ◎ | 13:45 | 13:46 | CUT B |
| GYOKOUTOKAMOME | 13:55 | 13:56 | CUT C |
| ODAYAKANAUMI | 14:04 | 14:06 | CUT C |
| GYOSEN | 14:07 | 14:08 | CUT C |
| MOKUZOUKYUUKA | 14:17 | 14:18 | CUT D |
| O-PUNINGU | 14:22 | 14:23 | CUT D |
| ROJIURA | 14:28 | 14:29 | CUT D, CUT E |
| TEROPPU | 20:23 | 20:23 | CUT B |
| TEBURENG | 21:33 | 21:34 | CUT E |

FIG. 46

| | INPUT START TIME | INPUT END TIME | ASSOCIATION CANDIDATE | RELATIONSHIP HIGH | ASSOCIATION CONSIDERING RELATIONSHIP |
|---|---|---|---|---|---|
| SHOSAINOYOUSU | 13:01 | 13:02 | CUT A | 4 | CUT A |
| SHOUMEINASHI | 13:12 | 13:14 | CUT A | – | CUT A |
| USUGURAI | 20:15 | 20:15 | CUT A | – | CUT A |
| NARE-SHONSOUNYUU ○ | 13:20 | 13:22 | CUT A, CUT B | 1 | CUT A |
| INTABYU- | 13:32 | 13:33 | CUT B | – | CUT B |
| KOUHAN ◎ | 13:42 | 13:43 | CUT B | – | CUT B |
| GYOKOUTOKAMOME | 13:45 | 13:46 | CUT B | – | CUT B |
| ODAYAKANAUMI | 13:55 | 13:56 | CUT B, CUT C | – | CUT C |
| GYOSEN | 14:04 | 14:06 | CUT C | – | CUT C |
| MOKUZOUKYUUKA | 14:07 | 14:08 | CUT C | – | CUT C |
| O-PUNINGU | 14:17 | 14:18 | CUT D | 12 | CUT D |
| ROJIURA | 14:22 | 14:23 | CUT D | 11 | CUT D |
| TEROPPU | 14:28 | 14:29 | CUT D, CUT E | – | CUT D, CUT E |
| TEBURENG | 20:23 | 20:23 | CUT B | – | CUT B |
| | 21:33 | 21:34 | CUT E | – | CUT E |

FIG. 47

CUT A
SHOSAINOYOUSU
SHOUMEINASHI
USUGURAI
NARE-SHONSOUNYUU

CUT B
○
INTABYU-
KOUHAN◎
TEROPPU

CUT C
GYOKOUTOKAMOME
ODAYAKANAUMI
GYOSEN

CUT D
MOKUZOUKYUUKA
O-PUNINGU
ROJIURA

CUT E
ROJIURA
TEBURENG

FIG. 50

| INPUT START | LONGITUDE | LATITUDE |
|---|---|---|
| 13:39 | 13950.0095 | 3600.1352 |
| 13:40 | 13950.0093 | 3600.1356 |
| 13:41 | 13950.0101 | 3600.1360 |
| 13:42 | 13950.0197 | 3600.1350 |
| 13:43 | 13950.0267 | 3600.1335 |
| 13:44 | 13950.0354 | 3600.1315 |
| 13:45 | 13950.0422 | 3600.1304 |
| 13:46 | 13950.0546 | 3600.1289 |
| 13:47 | 13950.0668 | 3600.1266 |
| 13:48 | 13950.0756 | 3600.1243 |
| 13:49 | 13950.0832 | 3600.1207 |
| 13:50 | 13950.0912 | 3600.1187 |
| 13:51 | 13950.0990 | 3600.1162 |
| 13:52 | 13950.1053 | 3600.1145 |
| 13:53 | 13950.1132 | 3600.1120 |
| 13:54 | 13950.1115 | 3600.1117 |
| 13:55 | 13950.1132 | 3600.1120 |
| 13:56 | 13950.1115 | 3600.1117 |
| 13:57 | 13950.1111 | 3600.1111 |
| 13:58 | 13950.1132 | 3600.1120 |
| 13:59 | 13950.1115 | 3600.1117 |

| INPUT START | LONGITUDE | LATITUDE |
|---|---|---|
| 14:00 | 13950.1111 | 3600.1111 |
| 14:01 | 13950.1132 | 3600.1120 |
| 14:02 | 13950.1115 | 3600.1117 |
| 14:03 | 13950.1120 | 3600.1109 |
| 14:04 | 13950.1112 | 3600.1114 |
| 14:05 | 13950.1110 | 3600.1120 |
| 14:06 | 13950.1195 | 3600.1135 |
| 14:07 | 13950.1300 | 3600.1148 |
| 14:08 | 13950.1420 | 3600.1170 |
| 14:09 | 13950.1532 | 3600.1211 |
| 14:10 | 13950.1621 | 3600.1240 |
| 14:11 | 13950.1705 | 3600.1258 |
| 14:12 | 13950.1798 | 3600.1280 |
| 14:13 | 13950.1985 | 3600.1329 |
| 14:14 | 13950.2044 | 3600.1359 |
| 14:15 | 13950.2052 | 3600.1360 |
| 14:16 | 13950.2063 | 3600.1372 |
| 14:17 | 13950.2049 | 3600.1365 |
| . | . | . |
| . | . | . |

FIG. 53

| NO | CHARACTER STRING | INPUT START TIME | INPUT END TIME | RELATIONSHIP LOW |
|---|---|---|---|---|
| 1 | SHOSAINOYOUSU | 13:01 | 13:02 | - |
| 2 | SHOUMEINASHI | 13:12 | 13:14 | - |
| 3 | USUGURAI | 20:15 | 20:15 | - |
| 4 | NARE-SHONSOUNYUU | 13:20 | 13:22 | - |
| 5 | ○ | 13:32 | 13:33 | - |
| 6 | INTABYU- | 13:42 | 13:43 | - |
| 7 | KOUHAN ◎ | 13:45 | 13:46 | 8 |
| 8 | GYOKOUTOKAMOME | 13:55 | 13:56 | 7 |
| 9 | ODAYAKANAUMI | 14:04 | 14:06 | - |
| 10 | GYOSEN | 14:07 | 14:08 | 11 |
| 11 | MOKUZOUKYUUKA | 14:17 | 14:18 | 10 |
| 12 | O-PUNINGU | 14:22 | 14:23 | - |
| 13 | ROJIURA | 14:28 | 14:29 | - |
| 14 | TEROPPU | 20:23 | 20:23 | - |
| 15 | TEBURENG | 21:33 | 21:34 | - |

FIG. 56

| | INPUT START TIME | INPUT END TIME | ASSOCIATION CANDIDATE | ASSOCIATION LOW | ASSOCIATION CONSIDERING ASSOCIATION |
|---|---|---|---|---|---|
| SHOSAINOYOUSU | 13:01 | 13:02 | CUT A | — | CUT A |
| SHOUMEINASHI | 13:12 | 13:14 | CUT A | — | CUT A |
| USUGURAI | 20:15 | 20:15 | CUT A | — | CUT A |
| NARE-SHONSOUNYUU | 13:20 | 13:22 | CUT A, CUT B | — | CUT A, CUT B |
| ○ | 13:32 | 13:33 | CUT B | — | CUT B |
| INTABYU- | 13:42 | 13:43 | CUT B | — | CUT B |
| KOUHAN ◎ | 13:45 | 13:46 | CUT B | 8 | CUT B |
| GYOKOUTOKAMOME | 13:55 | 13:56 | CUT B, CUT C | 7 | CUT C |
| ODAYAKANAUMI | 14:04 | 14:06 | CUT C | — | CUT C |
| GYOSEN | 14:07 | 14:08 | CUT C | 11 | CUT C |
| MOKUZOUKYUUKA | 14:17 | 14:18 | CUT D | 10 | CUT D |
| O-PUNINGU | 14:22 | 14:23 | CUT D | — | CUT D |
| ROJIURA | 14:28 | 14:29 | CUT D, CUT E | — | CUT D, CUT E |
| TEROPPU | 20:23 | 20:23 | CUT B | — | CUT B |
| TEBURENG | 21:33 | 21:34 | CUT E | — | CUT E |

FIG. 57

CUT A
SHOSAINOYOUSU
SHOUMEINASHI
USUGURAI
NARE-SHONSOUNYUU

CUT B
○
INTABYU-
KOUHAN◎
TEROPPU

CUT C
GYOKOUTOKAMOME
ODAYAKANAUMI
GYOSEN

CUT D
MOKUZOUKYUUKA
O-PUNINGU
ROJIURA

CUT E
ROJIURA
TEBURENG

ASSOCIATING DEVICE

TECHNICAL FIELD

The present invention relates to an associating device for associating a plurality of acquired data items to each other.

BACKGROUND ART

On a site of program production such as a broadcast station, in case a program is produced, necessary video materials are prepared in advance and selected or edited in the subsequent editing work to provide a program of a predetermined duration. To prepare video materials, it is necessary to shoot a variety of images in many places such as studios and outdoor locations. For example, a 45-minute program may be produced from as many as over 200 photographed video materials. It is a key to efficient program production to retrieve desired images without delay from a huge quantity of photographed video materials, that is, to reduce the time required to retrieve video materials.

As a video material retrieval method, there is a typical technique in which a photography director or their assistant records memo information related to details of a video material such as the target of photography and the photography state in association with the photographed material during or after photography and performs retrieval based on the memo information in the editing process.

Photographed materials are recorded in association with memo information, so that a memo input person has had to add photographed material identification information to identify a particular photographed material the memo pertains to while inputting the memo. For example, in case a memo is inputted while a video material is being photographed, the memo input person has to display and check the identification information on the material being photographed for example on the monitor screen or the finder of a camera used for photographing and input the identification information on the material as a memo in order to add the identification information before inputting an original memo to be recorded. This requires a heavy workload related to memo input. An exemplary document preparation device capable of storing and managing inputted characters in units of predetermined character strings is disclosed in Patent Reference 1.

Patent Reference 1: JP-A-8-185452, pp. 3-8, FIG. 2

DISCLOSURE OF THE INVENTION

Problems that the Invention is to Solve

The invention has been accomplished in view of the related art circumstances. An object of the invention is to provide an associating device capable of associating a memo with a photographed material without a memo input person explicitly adding information to identify the video material corresponding to the memo when inputting the memo, thereby reducing the material retrieval time without increasing the man-hours of memo input.

Means for Solving the Problems

The invention provides an associating device for associating a plurality of acquired data items with each other, the associating device comprising an association determination section which associates an inputted word with a photographed video material by using input start time information on the inputted word and photography time information on the photographed video material.

With this configuration, a word started to be inputted while a video material is being photographed is associated with the video material as a memo concerning the video material by way of association of the word with the video material that is based on the input time information on the word. The inputted memo information is associated with each corresponding video material when the word input person just inputs a word in the same way as handwriting without being conscious of association with the video material as in the related art. It is thus possible to associate memo information with each video material without increasing the workload in memo input, that is, without the memo input person having to check the identification information on the video material corresponding to the memo and explicitly enter the identification information while entering the memo. It is also possible to quickly retrieve a desired video material by using memo information as a search key. For example, when a desired video material is to be retrieved from among 200 video materials, a first search was made based on the date of photography to obtain 10 to 20 candidate video materials, and all the selected video materials were viewed to retrieve the desired video material in the related art. With the invention, it is possible to use as a search key the optimum keyword inputted for a video material, thus allowing one or two candidate video materials to be selected without viewing any video materials, thus reducing the work time to one tenth that in the previous approach.

The invention provides an associating device further comprising a word-to-word relationship determination section which determines a relationship between a plurality of inputted words to group the inputted words. The association determination section associates a grouped word group with the video material.

With this configuration, a plurality of words are grouped as memo information on the same cut, so that it is possible to appropriately associate a memo initially intended by a memo input person with a video material.

The invention provides an associating device further comprising a group-to-group relationship determination section which determines a relationship between the grouped word groups. The association determination section associates the grouped word group with the video material based on a determination result of the group-to-group relationship determination section.

With this configuration, it is possible to appropriately associate a memo with a video material based on the relationship between plural word groups.

The invention provides an associating device wherein the group-to-group relationship determination section determines the relationship between the grouped word groups by using correction history information.

With this configuration, the relationship between word groups is determined using correction history information. It is thus possible to appropriately associate a memo with a video material based on the relationship between plural word groups, for example to determine that an additional input to the first inputted memo is one for the same cut even in case the input times of words are not close to each other.

The invention provides an associating device wherein the group-to-group relationship determination section determines the relationship between the grouped word groups by using position information obtained when the words are inputted.

With this configuration, it is possible to appropriately associate a memo with a video material based on the relationship between plural word groups, for example to determine that memos inputted in different locations have lower degree of association with each other and are not intended for the same cut even in case the input times of words are close to each other.

The invention provides an associating device wherein the association determination section associates the word with the video material while referencing an operation log related to reproduction operation of the video material.

With this configuration, not only the photography time information on a video material but also the reproduction time information on reproduction of the video material is used to determine the relationship between a word and a video material. It is thus possible to associate a word with a video material with higher accuracy.

The invention provides an associating system comprising the associating device according to the invention, an input management device for acquiring and managing the input start time of each word, and an imaging device for photographing the video material.

The invention provides an input management device connected to the associating device according to the invention, the input management device acquiring and managing the input start time of each word.

Advantage of the Invention

With the invention, a word that has started to be inputted while a video material is being photographed is associated with a video material as a memo concerning the video material by way of association of the word with the video material that is based on the input time information on the word. The inputted memo information is associated with each corresponding video material when the word input person just inputs a word in the same way as handwriting without being conscious of association with the video material as in the related art.

BRIEF DESCRIPTION OF THE DRAWINGS

FIG. 4 It shows an input example of memo data inputted to an input device by an operator.

FIG. 5 It is a schematic view of the data structure of edit history data acquired by the data acquisition section.

FIG. 6 It is a schematic view of the data structure of the photographed material metadata of a single acquired photographed material.

FIG. 7 It shows an example of photographed material metadata obtained by extracting from the photographed material metadata only the information necessary to associate all photographed materials with memos.

FIG. 8 It shows an example of the operation log.

FIG. 9 It is a schematic view of the data structure of video material metadata chronologically integrated by internal processing relative to "photography" and "reproduction".

FIG. 11 It is a schematic view of the data structure of an internal table assumed when edit history data shown in FIG. 5 has been read up to the sixth row.

FIG. 12 It is a schematic view of the data structure of the internal table assumed when edit history data shown in FIG. 5 has been read up to the seventh row.

FIG. 13 It is a schematic view of the data structure of the internal table assumed when edit history data shown in FIG. 5 has been read up to the ninth row.

FIG. 14 It is a schematic view of the data structure of the internal table assumed when edit history data shown in FIG. 5 has been read up to the tenth row.

FIG. 15 It is a schematic view of the data structure of output data of the time stamp calculation section.

FIG. 18 It is a schematic view of the data structure of output data of the word-to-word relationship determination section.

FIG. 22 It is a schematic view of the association candidate determination result by the associating operation using the photography time information.

FIG. 24 It is a schematic view of the association candidate determination result by the associating operation using the reproduction time information.

FIG. 25 It is a schematic view of the final result of association between cuts and memo data.

FIG. 26 It is a conceptual drawing memo data associated with cuts.

FIG. 29 It shows an input example of memo data inputted to an input device by an operator.

FIG. 31 It is a schematic view of the data structure of edit history data acquired from the input device by the data acquisition section of the associating device.

FIG. 32 It is a schematic view of the data structure of the acquired video material metadata.

FIG. 33 It is a schematic view of the data structure of video material metadata chronologically integrated by internal processing relative to "photography" and "reproduction".

FIG. 35 It is a schematic view of the data structure of output data of the time stamp calculation section.

FIG. 36 It is a schematic view of the data structure of output data of the word-to-word relationship determination section.

FIG. 38 It is a schematic view of the data structure of output data of the group-to-group relationship determination section 50.

FIG. 41 It is a schematic view of the association candidate determination result by the associating operation using the photography time information.

FIG. 43 It is a schematic view of the association candidate determination result by the associating operation using the reproduction time information.

FIG. 44 It is a schematic view of the association between cuts and memo data that is based on the input time of memo data.

FIG. 46 It is a schematic view of the association candidate determination result using word group-to-word group relationship.

FIG. 47 It is a conceptual drawing of memo data associated with cuts.

FIG. 50 It is a schematic view of the data structure of position information acquired by the data acquisition section.

FIG. 53 It is a schematic view of the data structure of output data of the group-to-group relationship determination section 50.

FIG. 56 It is a schematic view of the association candidate determination result word group-to-word group relationship.

FIG. 57 It is a conceptual drawing memo data associated with cuts.

DESCRIPTION OF REFERENCE NUMERALS AND SIGNS

Figure 1:
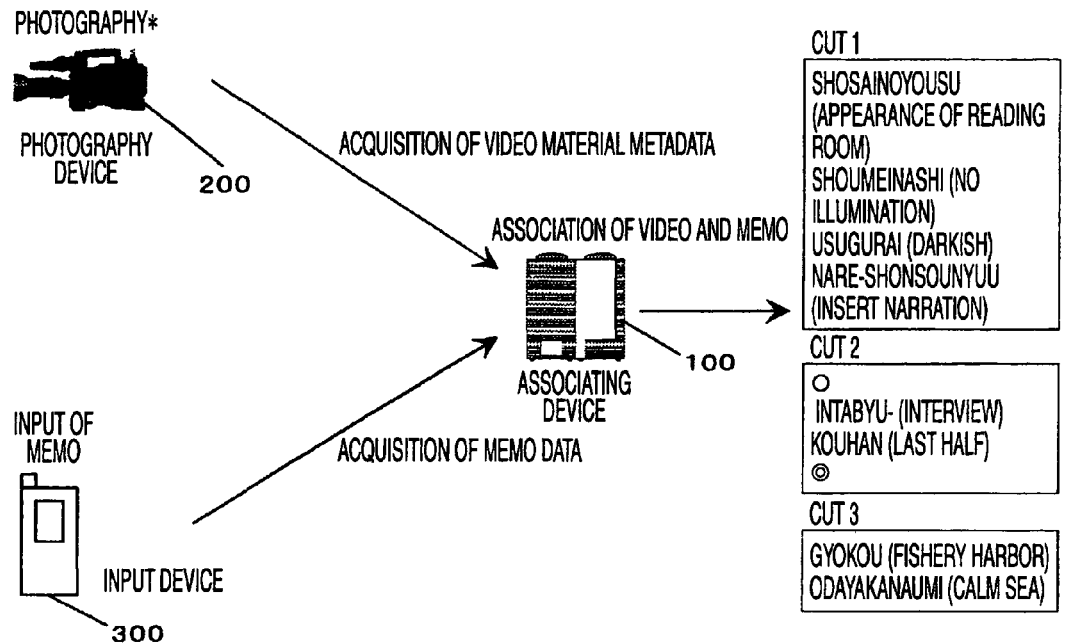
FIG. 1 It shows the outline of an associating system according to Embodiment 1 of the invention.

10: Data acquisition section
20: Time stamp calculation section
30: Word-to-word relationship determination section
40: Association determination section
50: Group-to-group relationship determination section
100.110: Associating device
200: Photography device
300, 310, 320: Input device
311: User input acceptance section
312: Edit history adding section
313: Time management section
314: Metadata retaining section
315: Metadata registration section
316: Position information acquisition section

BEST MODE FOR CARRYING OUT THE INVENTION

Embodiments of the invention will be described referring to drawings.

Embodiment 1

FIG. 1 shows the outline of an associating system according to Embodiment 1 of the invention. The associating system shown in FIG. 1 associates a video material with memo data related to the video material and includes an associating device 100, a photography device 200 and an input device 300.

The photography device 200 is a device including a well-known imaging portion capable of generating image data such as moving pictures and still images. The input device 300 is a device including an input portion equipped with input keys and a text editor program and capable of text editing.

The associating device 100 acquires video data photographed by the photography device 200 and video material metadata including the photography time information on the video data from the photography device 200. The operator of the input device 300 inputs into the input device memo information (hereinafter referred to as memo data) related to the details of the video material such as what subject was photographed and the photography state. The associating device 100 acquires information indicating the edit history of the memo data (hereinafter referred to as edit history data) from the input device 300.

The associating device 100 appropriately determines which of the plural photographed video materials (hereinafter referred to as cuts) the acquired memo data explains by way of the following portions and associates memo data to each cut.

Input of memo data may be made in parallel with photography using the photography device 200 or while video materials are reproduced after photography for confirmation of details of pictures. As mentioned later, memo data inputted during reproduction may be associated with video materials only in case the photography device 200 includes a feature to output an operation log such as reproduction time information.

Memo data may be transmitted from a portable type input device 300 equipped with the wireless communication feature shown in FIG. 1. For example, memo data may be transmitted as a mail body or an attached file from a well-known cell phone terminal. Or, memo data may be transmitted to an associating device 100 wired to the input device 300.

Figure 2:
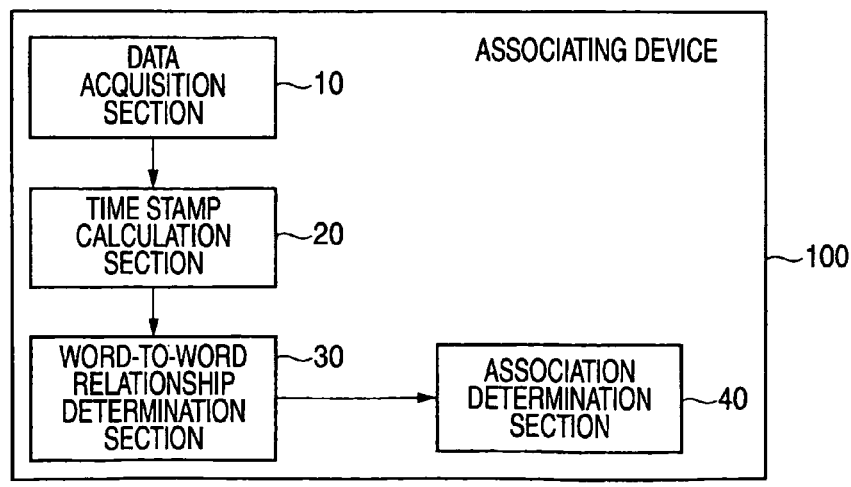
FIG. 2 It is a block diagram showing the internal configuration of an associating device according to Embodiment 1 of the invention.

FIG. 2 is a block diagram showing the internal configuration of an associating device according to Embodiment 1 of the invention. The associating device 100 is composed of a data acquisition section 10, a time stamp calculation section 20, a word-to-word relationship determination section 30, and an association determination section 40.

The data acquisition section 10 acquires video material metadata outputted from the photography device 200 and edit history data outputted from the input device 300. The edit history data is easily generated with a text editor program (application software program) installed in the input device 300. Edit history is saved each time the Enter key is pressed.

Generation of edit history data is based on the well-known feature of storing history of input or deletion of characters and corresponding details are omitted.

The time stamp calculation section 20 outputs, in units of words or clauses, the input start time information and input end time information on the edited memo data based on the edit history data acquired by the data acquisition section 10.

The word-to-word relationship determination section 30 determines the relationship between words based on a predetermined condition and groups related words as a "memo (word group) for the same cut". The word-to-word relationship determination section 30 extracts the input start time information on a word group based on the time stamps of a plurality of a plurality of grouped words. As mentioned later, the predetermined condition refers to one such as "words having a short interval therebetween are determined to belong to a memo for the same cut".

The association determination section 40 references the photography time information per cut of the acquired video material (information including the photography start time and photography end time) or reproduction time information (information including reproduction start time and reproduction end time) and the time stamp (including the input start time information) added to a word group to associate the word group with the cut of the video material.

Next, operation of the associating device thus configured will be described.

Figure 3:
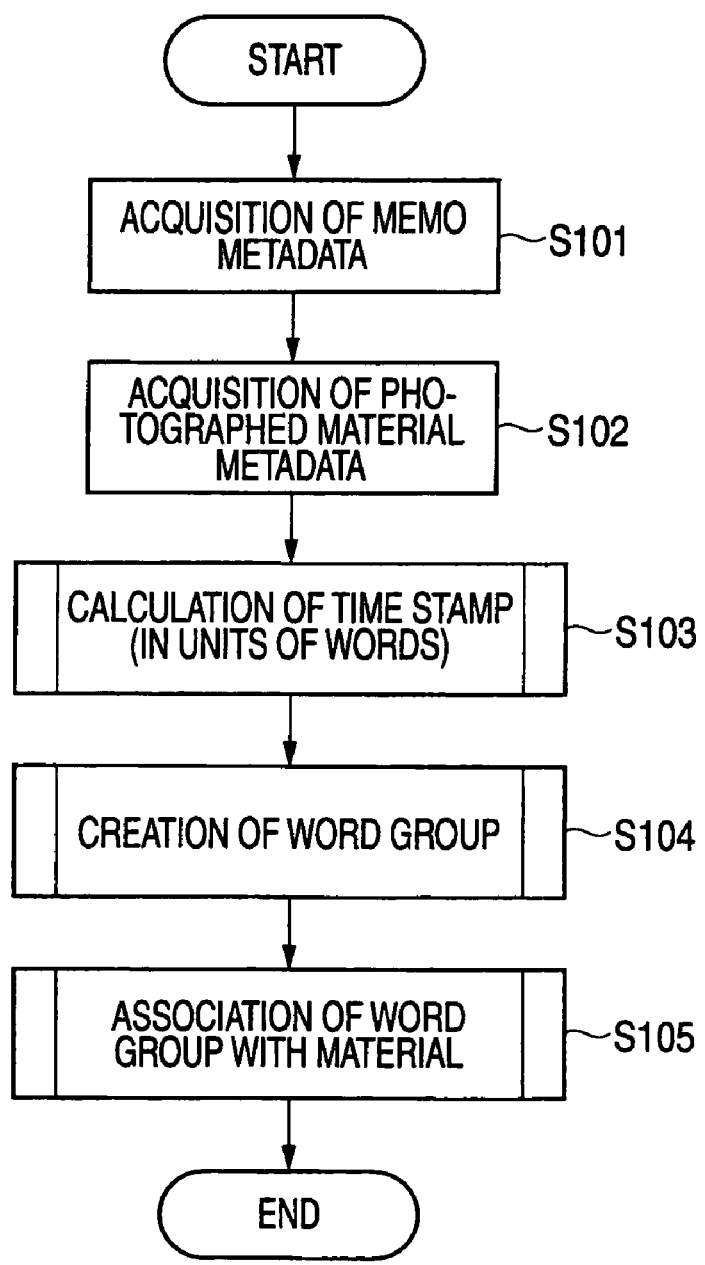
FIG. 3 It is a flowchart showing the procedure for associating operation of the associating device according to Embodiment 1 of the invention.

FIG. 3 is a flowchart showing the procedure for associating operation of the associating device according to Embodiment 1 of the invention. First, the data acquisition section 10 of the associating device 100 acquires the edit history data of memo data from the input device 300 (step S101). FIG. 4 shows an input example of memo data inputted to the input device 300 by an operator. FIG. 5 is a schematic view of the data structure of edit history data acquired by the data acquisition section 10. Edit history information such as the input start time, input end time, and input position (row and column) is retained in units of words or phrases for the memo input shown in FIG. 4.

Similarly, the data acquisition section 10 acquires video material metadata related to the operation of the photography device or photography time of photographed images (cuts) from the photography device 200 (step S102). FIG. 6 is a schematic view of the data structure of the photographed material metadata of a single acquired photographed material. For example, an MPEG-2 movie photographed with a digital video camera retains in a material file the information such as the file name, type, data size, data creation date/time and length as material file property information. Thus, by analyzing the header section of the photographed material file, it is possible to acquire metadata such as the file name, type, data size, data creation date/time and length.

In case "DVCPRO P2cam" is used as a photography device, material metadata called Clip metadata is generated while photography is under way. It is thus possible to acquire photographed material metadata without analyzing a photographed material file.

FIG. 7 shows an example of photographed material metadata obtained by extracting from the photographed material metadata shown in FIG. 6 only the information necessary to associate all photographed materials with memos. Association with memos is made using the "start time" and "end time" information in photography. In this embodiment, "file name" of the photographed material metadata is used as a "target cut", time information of "creation date/time" as a "start time" and the time information obtained by adding "length" to "creation date/time" as an "end time".

FIG. 8 shows an example of the operation log. For an operation log, "Operation" such as reproduction, reproduction end, fast-forward, or fast-forward end and "Time" when the operation took place are retained. A "target cut" is retained for reproduction.

FIG. 9 is a schematic view of the data structure of video material metadata chronologically integrated by internal processing relative to "photography" and "reproduction". FIGS. 8 and 9 show an example of video material metadata acquired from the photography device 200 capable of generating operation logs. That is, data on the cut reproduction time or the like is retained in the photography operation and reproduction confirmation after the photography. In this embodiment, the operation in which pause, rewind and fast-forward are repeated after reproduction is started and finally reproduction of the cut is stopped is defined as the "reproduction confirmation" time. The time any corresponding operation is started and the time the operation is ended are respectively retained as the start time and the end time. For example, in FIG. 8, "reproduction" of the target cut "Cut A" is made at "20:10" and "reproduction end" is made at "20:20". Thus, in FIG. 9, the start time of reproduction confirmation of the target cut "Cut A" is "20:10" and the end time is "20:20". For the target cut "Cut B", "reproduction" is made at "20:20", "fast-forward" at "20:22", "fast-forward end" at "20:23" and "reproduction end" at "20:27". In FIG. 9, the start time of reproduction confirmation of the target cut "Cut B" is "20:20" and the end time is "20:27". As shown in the figure, the order of photography is not always the same as the order of reproduction confirmation. A same cut may be reproduced for confirmation plural times or an arbitrary cut may be left without being reproduced for confirmation.

Figure 10:
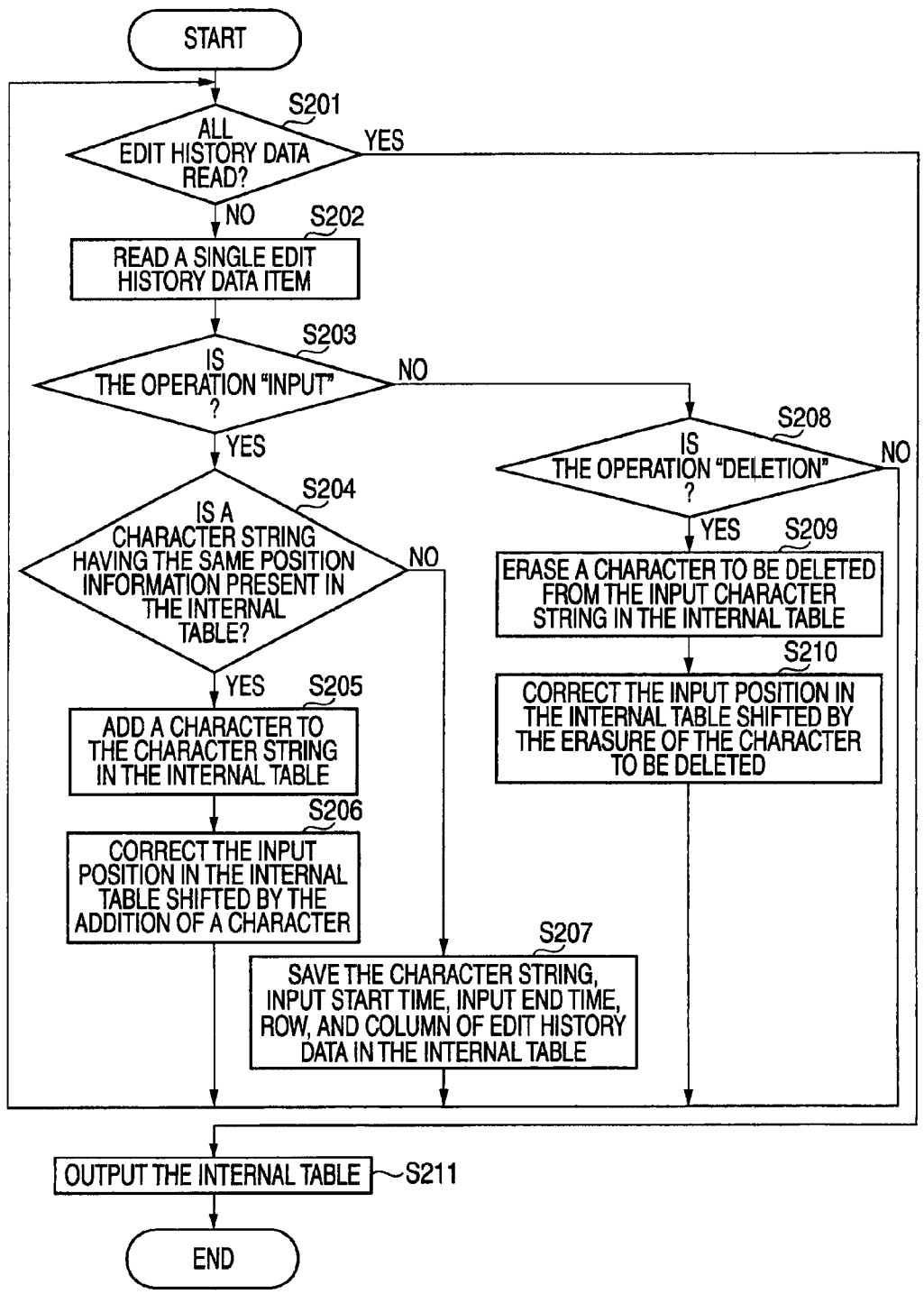
FIG. 10 It is a flowchart showing the procedure for calculating operation of the time stamp calculation section.

The time stamp calculation section 20 calculates calculate the input start time information and input end time information, that is, time stamps for the edited memo data in units of words or phrases based on the edit history data acquired by the data acquisition section 10 (step S103). FIG. 10 is a flowchart showing the procedure for calculating operation of the time stamp calculation section 20.

First of all, the time stamp calculation section 20 determines whether all edit history data has been read (step S201). In case the data has not been read, the time stamp calculation section 20 reads a single edit history data item (step S202). Next, the time stamp calculation section 20 determines whether the "Operation" of the read edit history data is "Input" (step S203). In case the "Operation" is "Input", the time stamp calculation section 20 determines whether a character string having the same position information is present in the internal table (step S204).

In case a character string having the same position information is present in the internal table, the time stamp calculation section 20 adds the target characters of the edit history data to the target character string in the internal table (step S205) and corrects the input position in the internal table shifted by the addition (step S206). In case no character strings having the same position information are present in the internal table, the time stamp calculation section 20 saves the target character string, input start time, input end time and information concerning the position of inputted characters (row/column information) of the edit history data in the internal table (step S207).

In case the "Operation" is not "Input" in the determination in step S203, the time stamp calculation section 20 determines whether the operation is "Deletion" (step S208). In case the operation is "Deletion", the time stamp calculation section 20 erases a character to be deleted from the input character string in the internal table (step S209) and corrects the input position in the internal table shifted by the deletion (step S210).

For example, FIG. 11 is a schematic view of the data structure of an internal table assumed when edit history data shown in FIG. 5 has been read up to the sixth row. When the seventh row of the edit history data shown in FIG. 5 is read, the internal table is modified as shown in FIG. 12. That is, the operation is "Input" and "a character string having the same position information is absent in the internal table" so that data of one row is added. When up to the ninth row of the edit history data shown in FIG. 5 is read, the internal table is modified as shown in FIG. 13. In this case, the operation is "Deletion" so that the character string "HEYA" in the data of the first row is changed to a blank. With the deletion, the character strings "NO" and "YOUSU" following the character string "HEYA" have their "input positions" shifted so that the numeric values of the "column" of the second and third rows of the internal table are changed. Further, when up to the tenth row of the edit history data shown in FIG. 5 is read, the internal table is modified as shown in FIG. 14. The operation is "Input" and "a character string having the same position information is present in the internal table". Thus, "SHOSAI" is added to the "Character string" (blank) of the data in the first row. With the addition, the "Input position" of the character strings "NO" and "YOUSU" following the character string "SHOSAI" is shifted again so that the numeric values of the "column" of the second and third rows of the internal table are changed.

In case the operation is not "Deletion" after the processing in steps S206, S207 or S210 or in the determination in step S208, execution returns to step S201 again and the similar procedure is repeated. In case all edit history data is read in step S201, the time stamp calculation section 20 outputs the internal table (step S210) to terminate the operation.

FIG. 15 is a schematic view of the data structure of output data of the time stamp calculation section 20. Data of the input start time and input end time is extracted with respect to words that have reflected editing such as addition and deletion.

Next, in the flowchart of FIG. 3, the word-to-word relationship determination section 30 determines the word-to-word relationship of the output data of the time stamp calculation section 20 based on a predetermined condition and groups the words into a single memo (word group) for the same cut (step S104). Various conditions may be set to determine the relationship. As an example, a method will be described for determining the relationship between words based on the average number of input characters. For example, three words "SHOSAI", "NO" and "YOUSU" originally compose a single memo for the same cut, that is, "SHOSAINOYOUSU (APPEARANCE OF READING ROOM)". In the edit history data, "SHOSAINOYOUSU" is discriminated in units of words as a minimum unit. Thus, the relationship between words is determined based on an assumption "there is a high probability that plural words inputted before the input speed drops below a predetermined value (average value in this embodiment) belong to the same memo," and groups the words as a word group.

Figure 16:
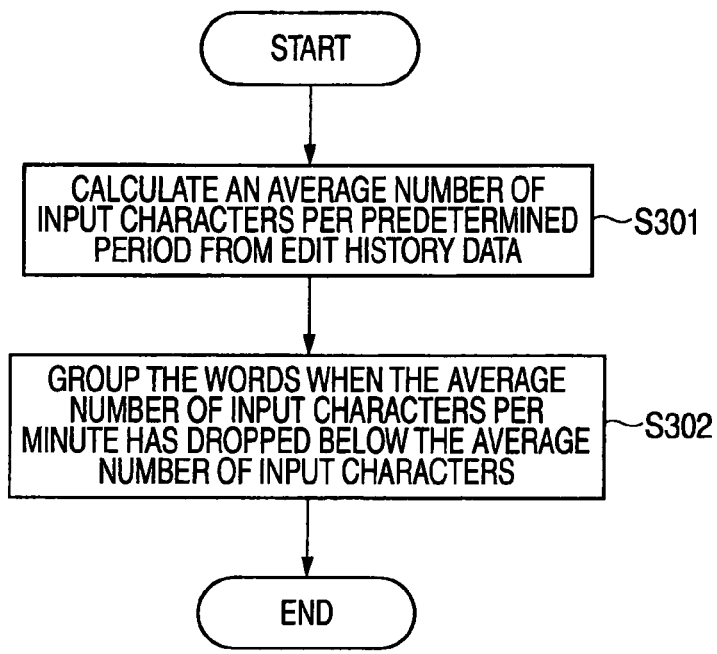
FIG. 16 It is a flowchart showing the word-to-word relationship determination operation procedure of a word-to-word relationship determination section.
Figure 17:
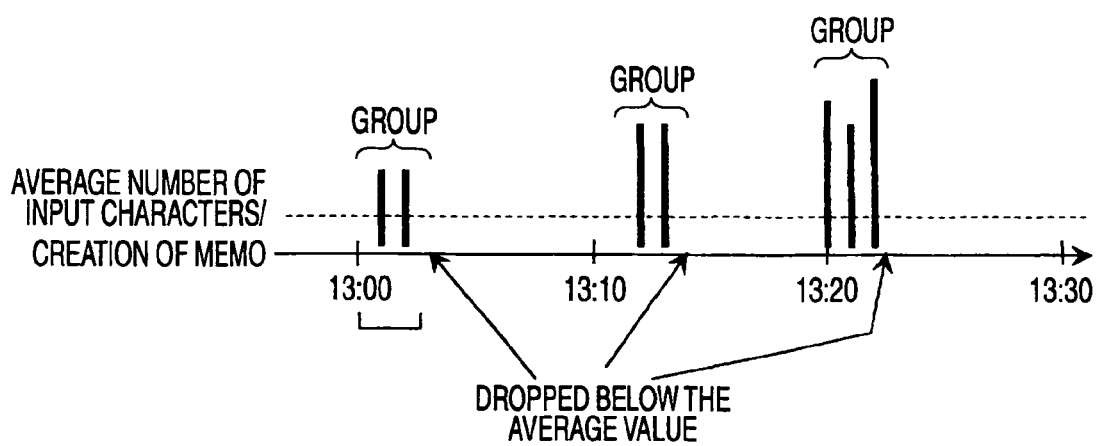
FIG. 17 It shows the outline of grouping of words.

FIG. 16 is a flowchart showing the word-to-word relationship determination operation procedure of a word-to-word relationship determination section 30. First, the word-to-word relationship determination section 30 calculates an average number of input characters per predetermined period from edit history data (step S301). The word-to-word relationship determination section 30 groups the words recognized at a point in time when the average number of input characters has dropped below an arbitrary threshold value. FIG. 17 shows the outline of grouping of words. In the illustrated example, the calculation result of the average number of input characters per minute is shown as a graph. Words from when the number of input characters per minute has dropped below the average number of input characters to when the number of input characters per minute has dropped below the average number of input characters again are grouped into a single word group.

While an average number of input characters per predetermined period is calculated and word groups are separated when the number of input characters per minute has dropped below the average number of input characters in this example as mentioned earlier, a word grouping method is not limited thereto. For example, words may be separated and grouped when the number of input characters has dropped below an arbitrary number of input characters instead of the average number of input characters. For example, the input interval of adjacent characters may be calculated and the point in time when the average value of input interval is exceeded or when an arbitrarily defined input interval is exceeded may be determined as a character break and grouping may be made accordingly. For example, a line feed, a punctuation mark or a space in a character string may be determined as a word break and grouping may be made accordingly.

When word grouping is made, the information on the input start time and input end time is also integrated. FIG. 18 is a schematic view of the data structure of output data of the word-to-word relationship determination section 30. The data on the input start time and input end time is arranged with respect to grouped word groups.

In the flowchart of FIG. 3 again, the association determination section 40 references video material metadata (refer to FIG. 9) and memo data (refer to FIG. 18) to determine the relationship between the cut photography time or reproduction time and the word group input start time and associate cuts with memo data (step S105).

Figure 19:
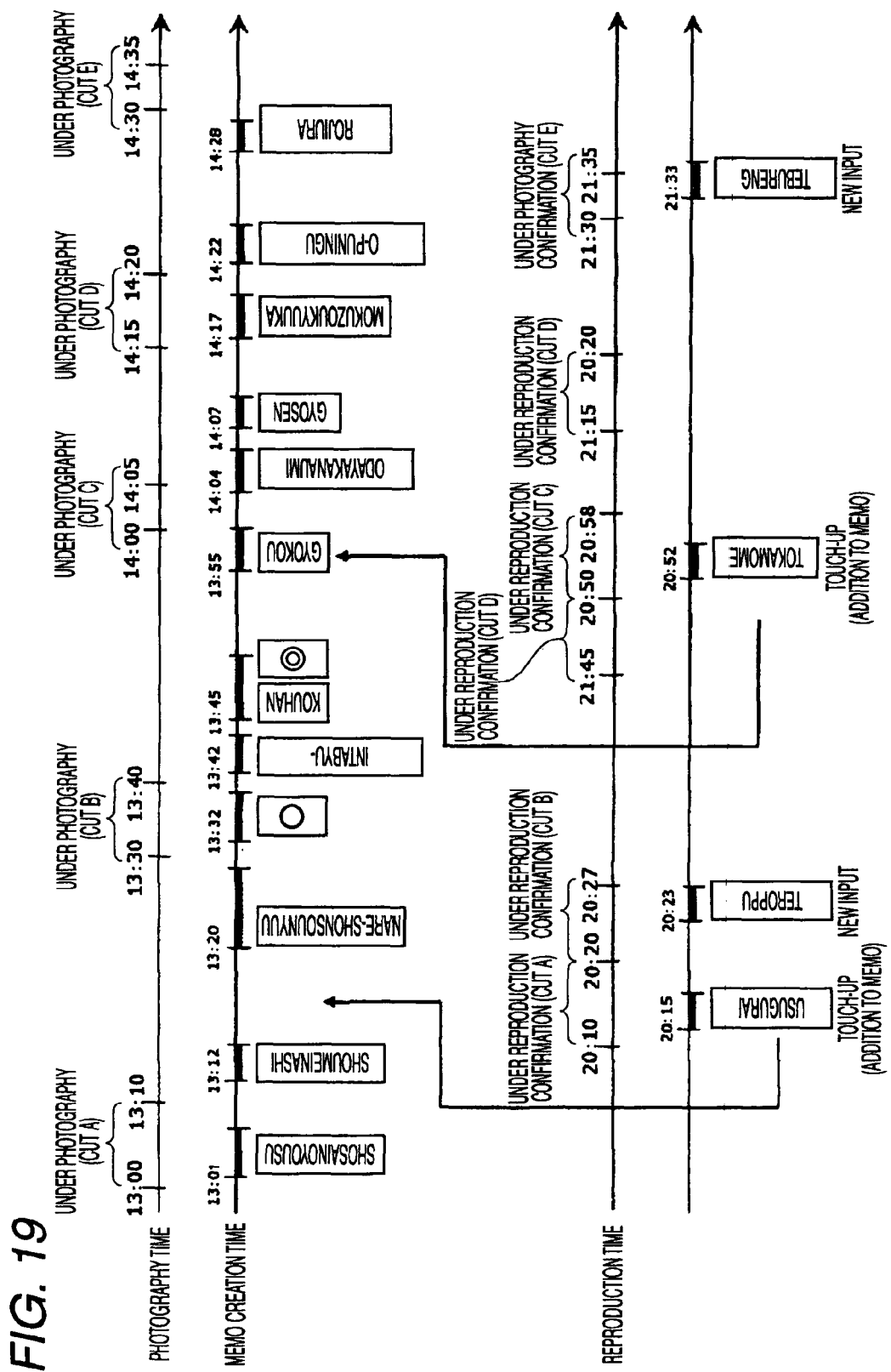
FIG. 19 It shows the relationship between the input start times of word groups and photography times or reproduction times of cuts arranged with the passage of time.

FIG. 19 shows the relationship between the input start times of word groups and photography times or reproduction times of cuts arranged with the passage of time. Which cut an arbitrary word group as memo data describes is determined in accordance with the criteria described below.

Figure 20:
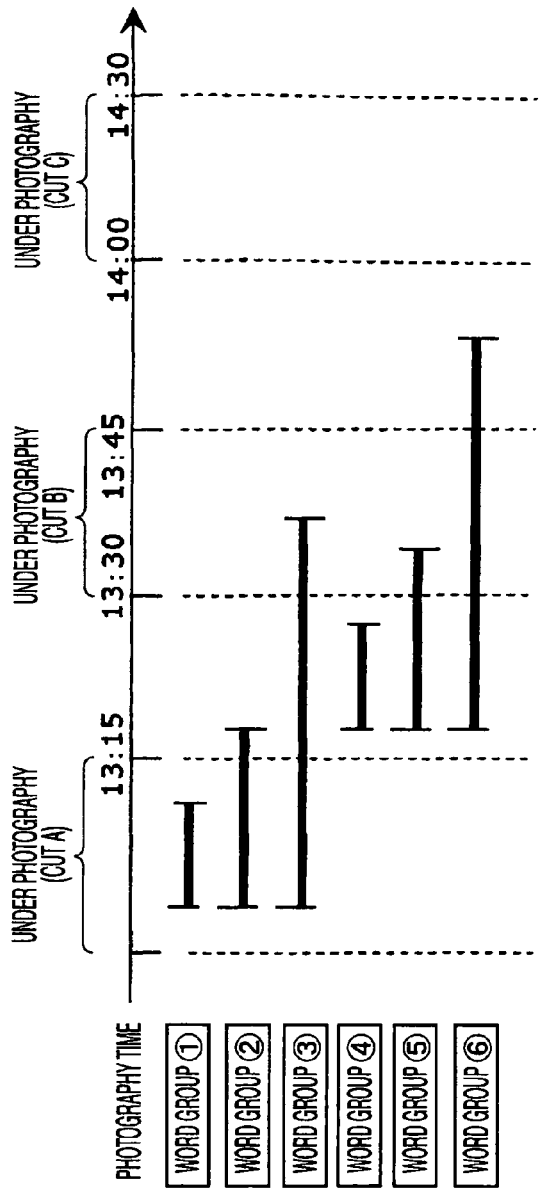
FIG. 20 It explains the association between the input times of memo data and photography times of cuts.

FIG. 20 explains the "association of the input times of memo data with photography times of cuts" as a criterion in the associating operation using the photography time information described later. In Embodiment 1, memo data started to be inputted during photography of an arbitrary cut is assumed as information on the cut. Memo data started to be inputted between photographic sessions of two separate cuts is assumed as information on either the first or second cut. As mentioned later, in case input is started between photographic sessions of two separate cuts, the intermediate period may be divided into two and setting may be made assuming the first time as information on the cut photographed immediately before and the second time as information on the cut photographed immediately afterward.

Figure 21:
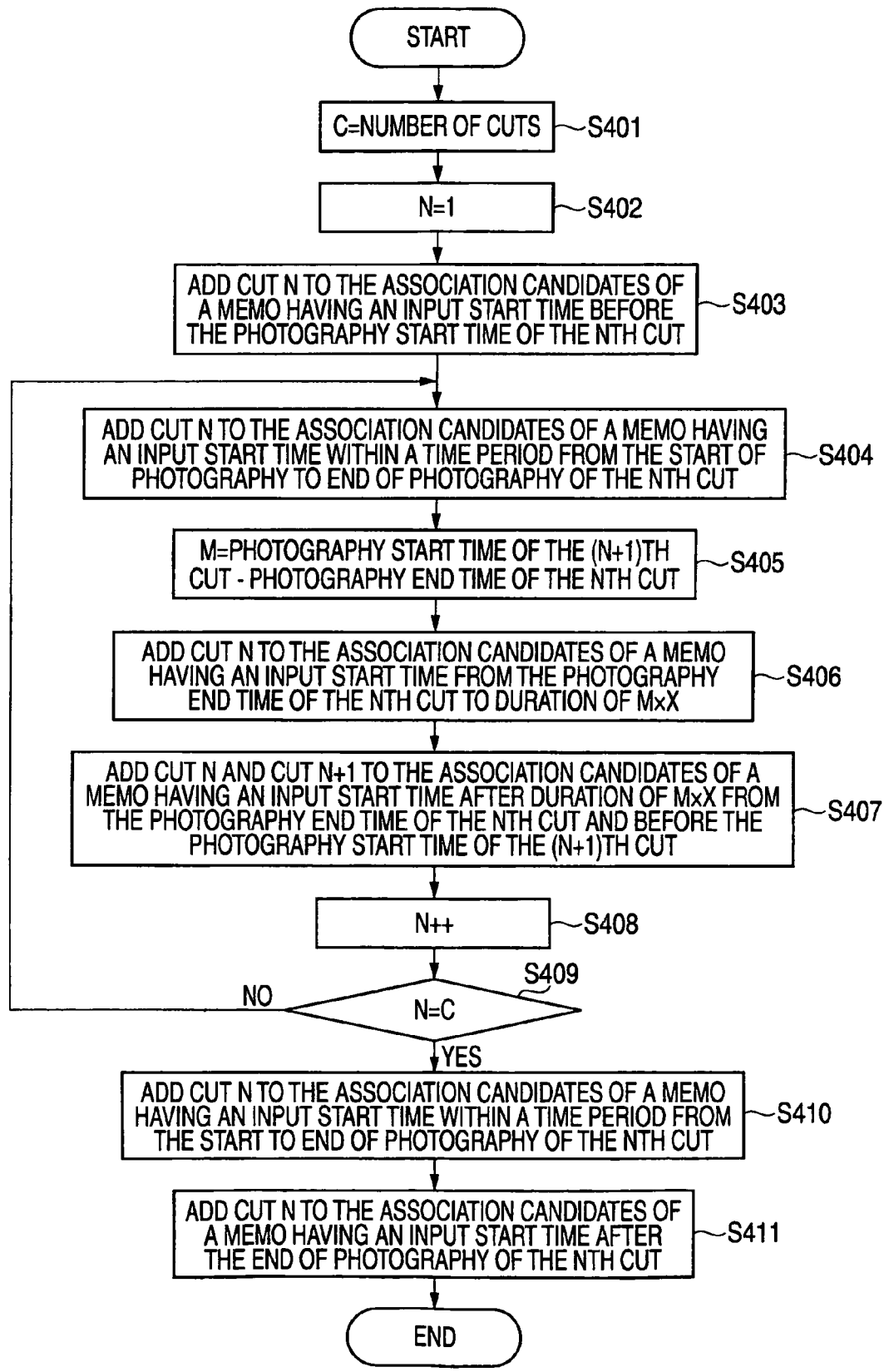
FIG. 21 It is a flowchart showing the procedure for the associating operation using the photography time information.

Next, particular operation of the association determination section 40 will be described. FIG. 21 is a flowchart showing the procedure for the associating operation using the photography time information. FIG. 22 is a schematic view of the association candidate determination result by the associating operation using the photography time information. First, initial settings of "C=Number of cuts" and "N=1" are made (steps S401 and S402). Next, the association determination section 40 adds Cut N to the association candidates of a memo having an input start time before the photography start time of the Nth cut (meaning the first cut since N=1) based on an assumption "there is a high probability that memo data inputted before start of photography is one concerning a cut to be photographed next" (step S403).

Next, the association determination section 40 adds Cut N to the association candidates of a memo having an input start time within a time period from the start of photography to end of photography of the Nth cut based on an assumption "there is a high probability that memo data inputted during photography is one concerning a cut under photography" (step S404). For example, the photography time of Cut A is from 13:00 to 13:10 (refer to FIG. 9) and the input start time of a memo "SHOSAINOYOUSU" is 13:01 (refer to FIG. 18), so that "Cut A" is added to the association candidates of the memo "SHOSAINOYOUSU" (refer to FIG. 22).

Next, the value M (M=photography start time of the (N+1)th cut−photography end time of the Nth cut) is calculated (step S405). The association determination section 40 adds Cut N to the association candidates of a memo having an input start time within the time period of M×X from the photography end time of the Nth cut, where X is a coefficient to arbitrarily set an elapsed time after the end of photography based on an assumption "there is a high probability that memo data inputted within a predetermined elapsed time after the photography is one concerning a cut just photographed" (step S406). For example, the time period M from the photography End time of Cut A 13:10 to the photography start time of next Cut B13:30 is 20 minutes (refer to FIG. 9) and the input start time of the memo "SHOUMEINASHI(NO ILLUMINATION)" is 13:12 (refer to FIG. 18) which is within 20 minutes×0.5=10 minutes from 13:10. Thus "Cut A" is added to the association candidates of the memo (refer to FIG. 22). While the time period from the photography end time of the Nth cut to the photography start time of the (N+1)th cut is divided into two (X=0.5) in this example, the value of the coefficient X changes with the genre of the program and photography style, the coefficient X may be specified by the user. The method for setting the coefficient X is not the prime purpose of the invention so that the corresponding description is omitted.

Next, the association determination section 40 adds Cut N and Cut N+1 to the association candidates of a memo having an input start time after duration of M×X from the photography end time of the Nth cut and before the photography start time of the (N+1)th cut based on an assumption "there is a high probability that memo data inputted within a time period from the end of a predetermined elapsed time after the photography to the start of the photography of the next cut is one concerning a cut just photographed or a cut to be photographed next" (step S407). For example, the time period M from the photography end time of Cut B 13:40 to the photography start time of next Cut C 14:00 is 20 minutes (refer to FIG. 9) and the input start time of the memo "GYOKOUTOKAMOME(FISHERY HARBOR AND SEA GULL)" is 13:55 (refer to FIG. 18) which is after 13:40+20 minutes×0.5=13:50. Thus "Cut B and cut C" are added to the association candidates of the memo (refer to FIG. 22). Note that the time period from the photography end time of the Nth cut to the photography start time of the (N+1)th cut is divided into two (X=0.5) in this example.

Next, the association determination section 40 increments the numeric value of N by 1 (step S408) and determines whether the value of N has reached the value of C (step S409).

In case the value of N has not reached the value of C (NO in step S409), the association determination section 40 returns to step S404 and executes the above processing on the next cut.

In case the value of N has reached the value of C (YES in step S409), that is, the last cut is reached, the association determination section 40 adds Cut N to the association candidates of a memo having an input start time within a time period from the start to end of photography of the Nth cut (meaning the last cut in this example) based on an assumption "there is a high probability that memo data inputted during photography of the last cut is one concerning the last cut under photography" (step S410).

Next, the association determination section 40 adds Cut N to the association candidates of a memo having an input start time after the end of photography of the Nth cut (meaning the last cut in this example) based on an assumption "there is a high probability that memo data inputted after the end of photography of the last cut is one concerning the last cut photographed" (step S411). For example, the end time of photography of Cut E is 14:35 (refer to FIG. 9) and the input start time of the memo "USUGURAI(DARKISH)" is 20:15 (refer to FIG. 18). Thus, "Cut E" is added to the association candidates of this memo (refer to FIG. 22).

The above procedure associates photographed cuts with inputted memo data. While the interval between photographic sessions is divided by a ratio in the above procedure, a break may be detected using another method. For example, the input intervals between memos inputted while photography is not under way may be checked and a section with the broadest interval may be assumed as a break. As shown in FIG. 14, a memo started to be inputted between photographic sessions may be associated with two cuts photographed immediately before and immediately afterward. While a memo within the duration of M×0.5 is associated with the immediately preceding cut and a subsequent memo with both cuts in this embodiment, this is only an exemplary way of allotment. As shown in FIG. 20, a memo inputted between photographic sessions may be associated with both of the immediately preceding cut and the immediately following cut (in the case of X=0). A memo inputted within the duration of M×X may be associated with only the immediately preceding cut and a subsequent memo may be associated with only the immediately following cut.

Figure 23:
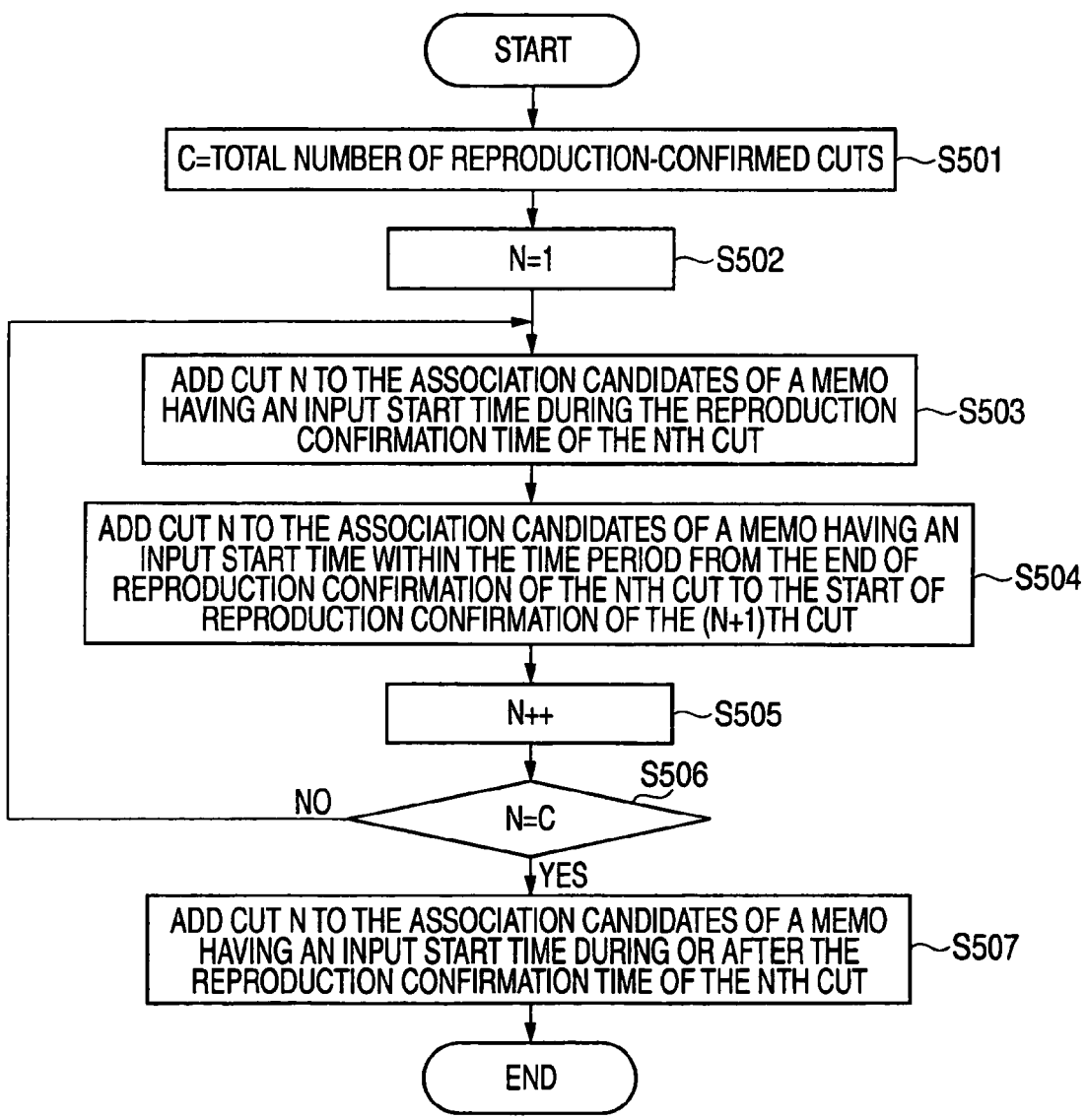
FIG. 23 It is a flowchart showing the procedure for the associating operation using the reproduction time information.

FIG. 23 is a flowchart showing the procedure for the associating operation using the reproduction time information. FIG. 24 is a schematic view of the association candidate determination result by the associating operation using the reproduction time information. First, initial settings of "C=Total number of reproduction-confirmed cuts" and "N=1" are made (steps S501 and S502).

Next, the association determination section 40 adds Cut N to the association candidates of a memo having an input start time during the reproduction confirmation time of the Nth cut based on an assumption "there is a high probability that memo data inputted during reproduction is one concerning a cut under reproduction" (step S503). For example, the reproduction confirmation time of Cut A is 20:10 to 20:20 (refer to FIG. 9) and the input start time of the memo "USUGURAI" is 20:15 (refer to FIG. 18). Thus, "Cut A" is added to the association candidates of this memo (refer to FIG. 24).

Next, the association determination section 40 adds Cut N to the association candidates of a memo having an input start time within the time period from the end of reproduction confirmation of the Nth cut to the start of reproduction confirmation of the (N+1)th cut based on an assumption "there is a high probability that memo data inputted within the time period from the end of reproduction of an arbitrary cut to the start of reproduction of a next cut is one concerning a cut reproduced immediately before" (step S504).

Next, the association determination section 40 increments the numeric value of N by 1 (step S505) and determines whether the value of N has reached the value of C (step S506).

In case the value of N has not reached the value of C (NO in step S506), the association determination section 40 returns to step S503 and executes the above processing on the next cut.

In case the value of N has reached the value of C (YES in step S506), that is, the last cut is reached, the association determination section 40 adds Cut N to the association candidates of a memo having an input start time during or after the reproduction confirmation time of the Nth cut (meaning the last cut in this example) based on an assumption "there is a high probability that memo data inputted during or after reproduction of the last cut is one concerning the cut reproduced last" (step S507). For example, the reproduction confirmation time of Cut E is 21:30 to 21:35 (refer to FIG. 9) and the input start time of the memo "TEBURENG(SHAKING NG)" is 21:33 (refer to FIG. 18). Thus, "Cut E" is added to the association candidates of this memo (refer to FIG. 24).

The above procedure associates reproduced cuts with inputted memo data.

The association determination section 40 determines the final association based on the association candidate determination result of "association using photography time information" and "association using reproduction time information". FIG. 25 is a schematic view of the final result of association between cuts and memo data. In this embodiment, the association candidates that are based on the reproduction time are given priority for memo data inputted after the end of the cut photographed last. The memo "USUGURAI" determined as "Cut E" in the "association using the photography time information" is determined as "Cut A" in the "association using the reproduction time information" so that the memo "USUGURAI" is finally determined as "Cut A". Similarly, the memo "TEROPPU(TELOP)" determined as "Cut E" before is now determined as "Cut A". FIG. 26 is a conceptual drawing memo data associated with cuts.

As described above, with the associating system according to this embodiment, association of words with video materials is made based on the input time information of words. Thus, words started to be inputted during or immediately after the photography of video material and words inputted during reproduction confirmation are associated as memos concerning the video materials with photographed materials. It is thus possible for a memo input person to associate a word written down as a memo with a video material in memo input without requiring workload of checking the photographed material identification information to identify which video material the memo corresponds to or inputting the checked photographed material identification information together with the memo. Association of words with video materials is determined using the photography time information on video materials as well as reproduction time information in reproduction of video materials. This provides association of words with video materials with higher accuracy. When a material is retrieved, a word as a memo may be used as a keyword to quickly retrieve an intended material.

Embodiment 2

Figure 27:
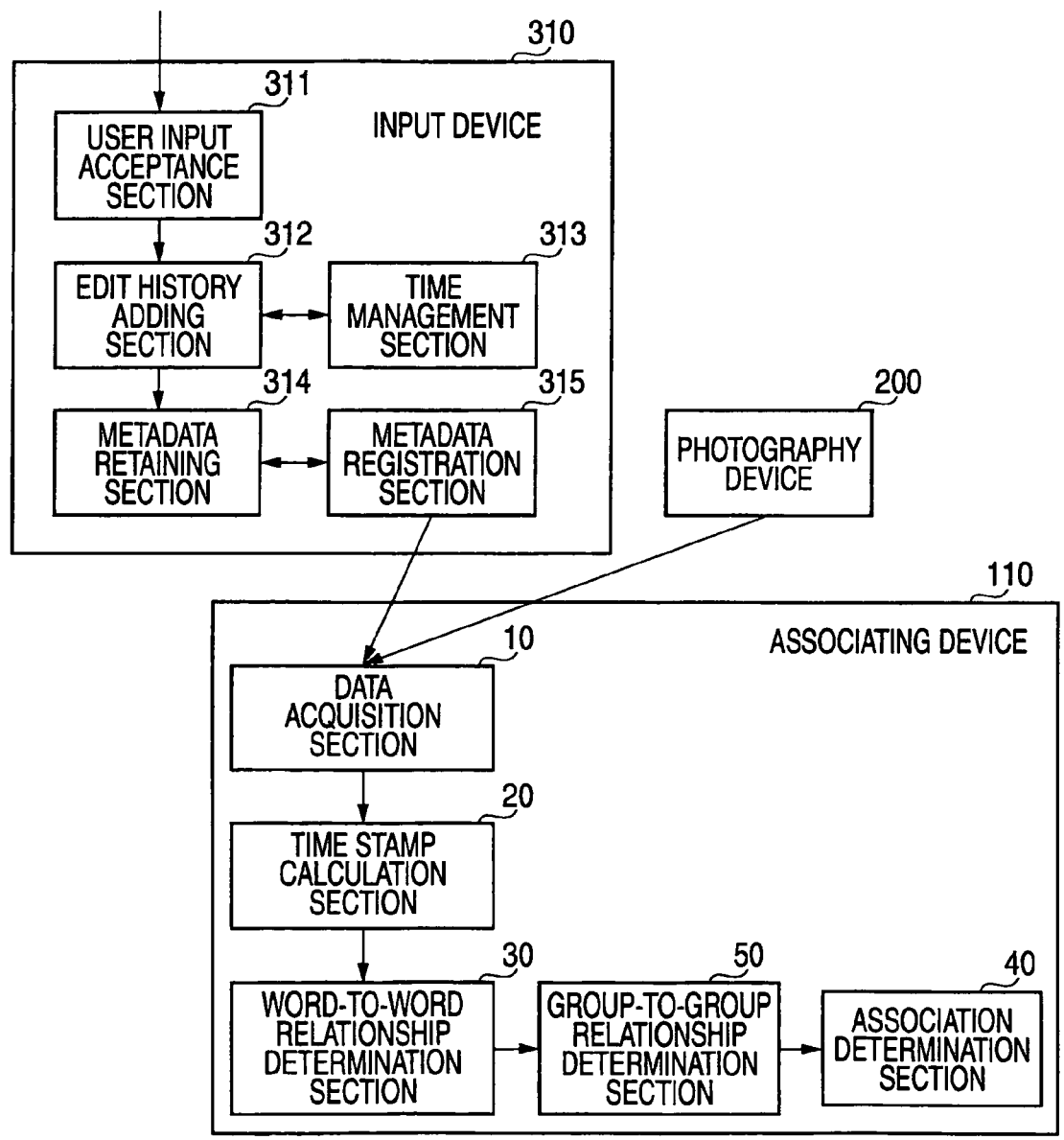
FIG. 27 It shows the outline of an associating system according to Embodiment 2 of the invention.

FIG. 27 shows the outline of an associating system according to Embodiment 2 of the invention. The associating system includes an associating device 110, a photography device 200 and an input device 310. The photography device 200 is the same as that used in Embodiment 1 so that the corresponding description is omitted.

The input device 310 is a device including an input portion equipped with input keys and a text editor program and capable of text editing. As illustrated, the input device 310 is mainly composed of a user input acceptance section 311, an edit history adding section 312, a time management section 313, a metadata retaining section 314, and a metadata registration section 315 and the like.

The user input acceptance section 311 accepts an input from the operator of the input device. The edit history adding section 312 adds an edit history related to text input while referencing the time management section 313 having a clock feature. The metadata retaining section 314 generates and retains metadata related to an edit history. The metadata registration section 315 registers generated metadata. In other words, edit history data related to input of memo data is generated by the input device 310 in this embodiment.

The associating device 110 acquires video data photographed by the photography device 200 and video material metadata including the photography time information on the video data from the photography device 200. The associating device 110 acquires from the input device 310 the edit history data of the memo data inputted by the operator of the input device 310.

The associating device 110 appropriately determines which of the plural photographed cuts the acquired memo data explains by way of the following portions and associates memo data to each cut.

Input of memo data may be made in parallel with photography using the photography device 200 or while video materials are reproduced after photography for confirmation of details of pictures. As mentioned later, memo data inputted during reproduction may be associated with video materials only in case the photography device 200 includes a feature to output an operation log such as reproduction time information.

The input device 310 and the photography device 200 may be the same device including respective features.

The associating device 110 is composed of a data acquisition section 10, a time stamp calculation section 20, a word-to-word relationship determination section 30, an association determination section 40, and a group-to-group relationship determination section 50. That is, the associating device 110 used in Embodiment 2 is the associating device 100 used in Embodiment 1 with the group-to-group relationship determination section 50 added thereto.

The data acquisition section 10 acquires video material metadata outputted from the photography device 200 and edit history data outputted from the input device 300.

The time stamp calculation section 20 outputs, in units of words or clauses, the input start time information and input end time information on the edited memo data based on the edit history data acquired by the data acquisition section 10.

The word-to-word relationship determination section 30 determines the relationship between words based on a predetermined condition and groups related words as a "memo (word group) for the same cut". The word-to-word relationship determination section 30 extracts the input start time information on a word group based on the time stamps of a plurality of grouped words.

The group-to-group relationship determination section 50 determines respective relationships between the word groups grouped by the word-to-word relationship determination section 30 based on the correction history of memo data in order to enhance the accuracy of association of memo data with cuts. For example, assuming that there is a word group that cannot be appropriately associated with a cut in the determination using the input time information on memo data, in case presence of another word group closely related to the first word group is confirmed, a cut with which the other word group is associated may be applied to the first word group also.

In Embodiment 2, the association determination section 40 references the information on the relationship between word groups on top of the photography time information or reproduction time information on cuts and input time information on word groups to associate words groups to cuts of video materials.

Next, operation of the associating device in a system thus configured will be described.

Figure 28:
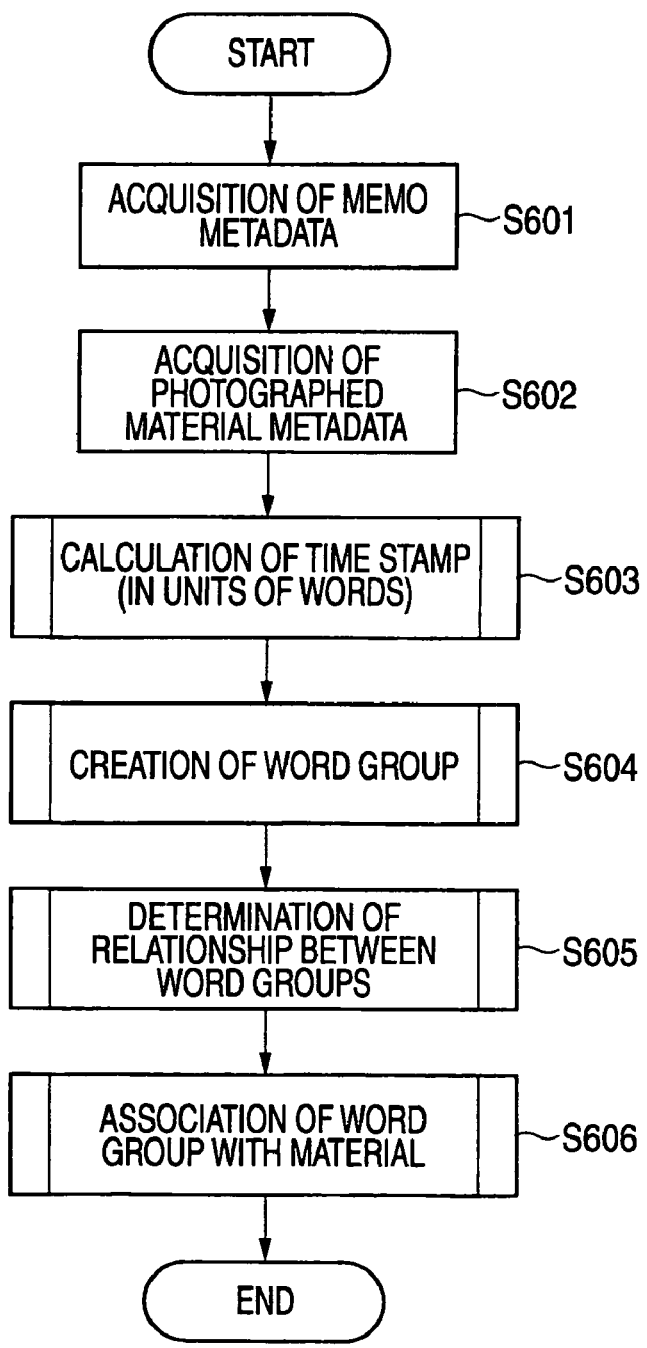
FIG. 28 It is a flowchart showing the procedure for associating operation of the associating device according to Embodiment 2 of the invention.

FIG. 28 is a flowchart showing the procedure for associating operation of the associating device according to Embodiment 2 of the invention. First, the data acquisition section 10 of the associating device 110 acquires the edit history data of memo data from the input device 300 (step S601). FIG. 29 shows an input example of memo data inputted to the input device 310 by an operator.

Figure 30:
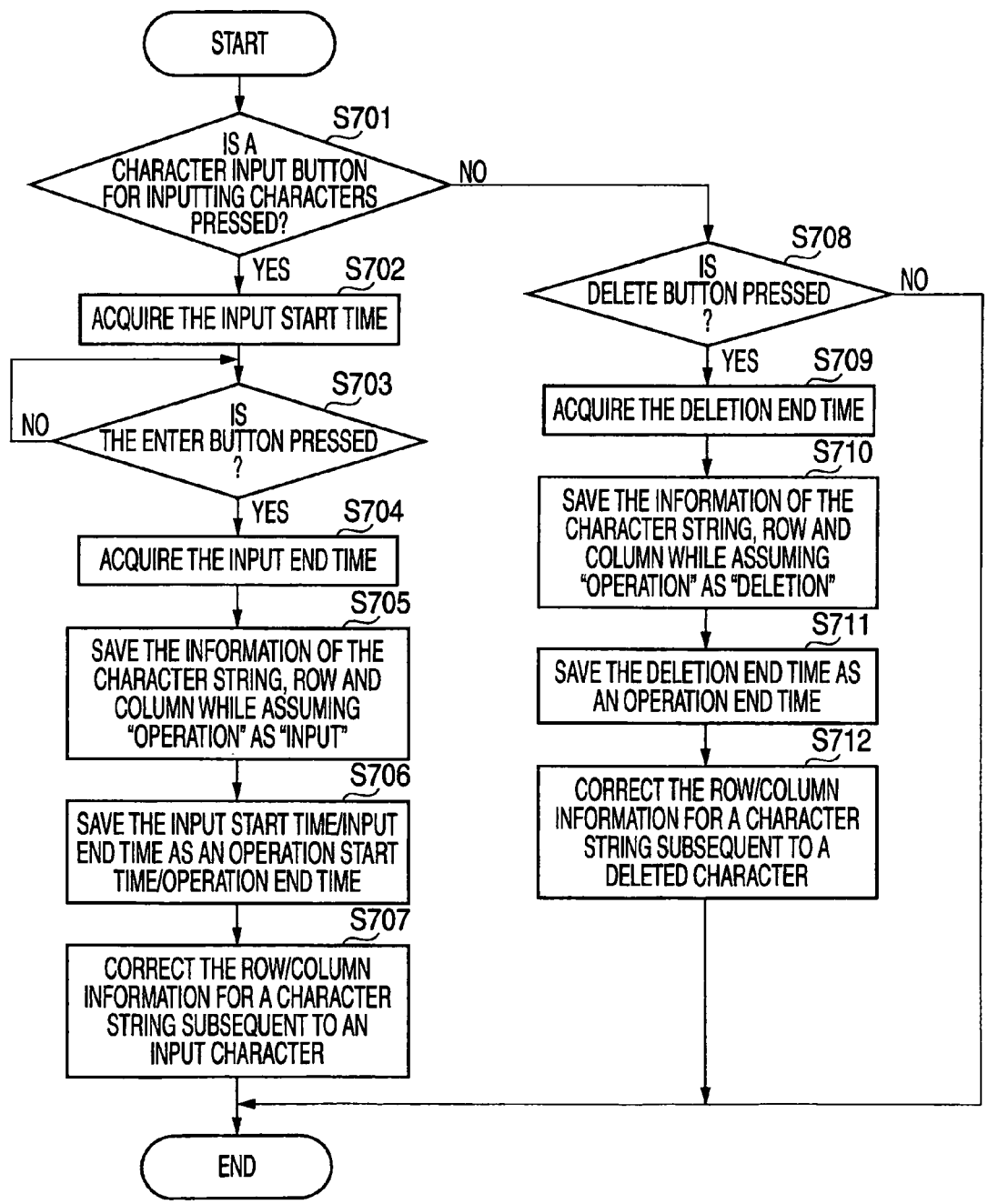
FIG. 30 It is a flowchart showing the memo data input operation procedure of an input device used in Embodiment 2.

The memo data input operation on the input device 310 will be described. FIG. 30 is a flowchart showing the memo data input operation procedure of an input device 310 used in Embodiment 2. First, the user input acceptance section 311 determines whether a character input button for inputting characters is pressed (step S701). In case the button is pressed, the edit history adding section 312 references the time management section 313 and acquires the input start time (step S702).

Next, the user input acceptance section 311 determines whether the Enter button for confirming an input is pressed (step S703). In case the Enter button is pressed, the edit history adding section 312 acquires the input end time in the same way (step S704) and saves the information of the character string, row and column while assuming "Operation" as "Input" (step S705). Further, the edit history adding section 312 saves the input start time and input end time as an operation start time/operation end time (step S706) and corrects the row/column information for a character string subsequent to an input character (step S707). This processing is to correct the position information (row and column) on the characters already written subsequently to characters inputted in the middle of a sentence rather than at the end of description. For example, one character is added on the left of an arbitrary character in a memo. The arbitrary character is shifted rightward by one character so that the (row/column) information is an increment of column by one.

In case the character input button is not pressed in the determination whether the character input button is pressed, the user input acceptance section 311 determines whether the Delete button for deleting characters is pressed (step S708). In case the Delete button is pressed, the edit history adding section 312 acquires the deletion end time (step S709) and saves the information of the character string, row and column while assuming "Operation" as "Deletion" (step S710). Further, the edit history adding section 312 saves the deletion end time as an operation end time (step S711) and corrects the row/column information for a character string subsequent to a deleted character (step S712). This processing is to correct the position information (row and column) on the characters already written subsequently to a character deleted in the middle of a sentence rather than at the end of description. For example, one character is deleted on the left of an arbitrary character in a memo. The arbitrary character is shifted leftward by one character so that the (row/column) information is a decrement of column by one.

FIG. 31 is a schematic view of the data structure of edit history data acquired from the input device 310 by the data acquisition section 10 of the associating device 110. For a memo input shown in FIG. 29, edit history information such as an input start time, input end time and input position (row/column) is retained in units of words or phrases.

In the flowchart of FIG. 28 again, the data acquisition section 10 similarly acquires video material metadata related to the operation of the photography device or photography time of cuts from the photography device 200 (step S602). FIG. 32 is a schematic view of the data structure of the acquired video material metadata. FIG. 33 is a schematic view of the data structure of video material metadata chronologically integrated by internal processing relative to "photography" and "reproduction". FIGS. 32 and 33 show an example of video material metadata acquired from the photography device 200 capable of generating operation logs. That is, data on the cut reproduction time or the like is retained in the photography operation and reproduction confirmation after the photography. In the example of FIGS. 32 and 33, the operation in which pause, rewind and fast-forward are repeated after reproduction is started and finally reproduction of the cut is stopped is defined as the "reproduction confirmation" time. The time any corresponding operation is started and the time the operation is ended are respectively retained as the start time and the end time. As shown in the figure, the order of photography is not always the same as the order of reproduction confirmation. A same cut may be reproduced for confirmation plural times or an arbitrary cut may be left without being reproduced for confirmation.

Figure 34:
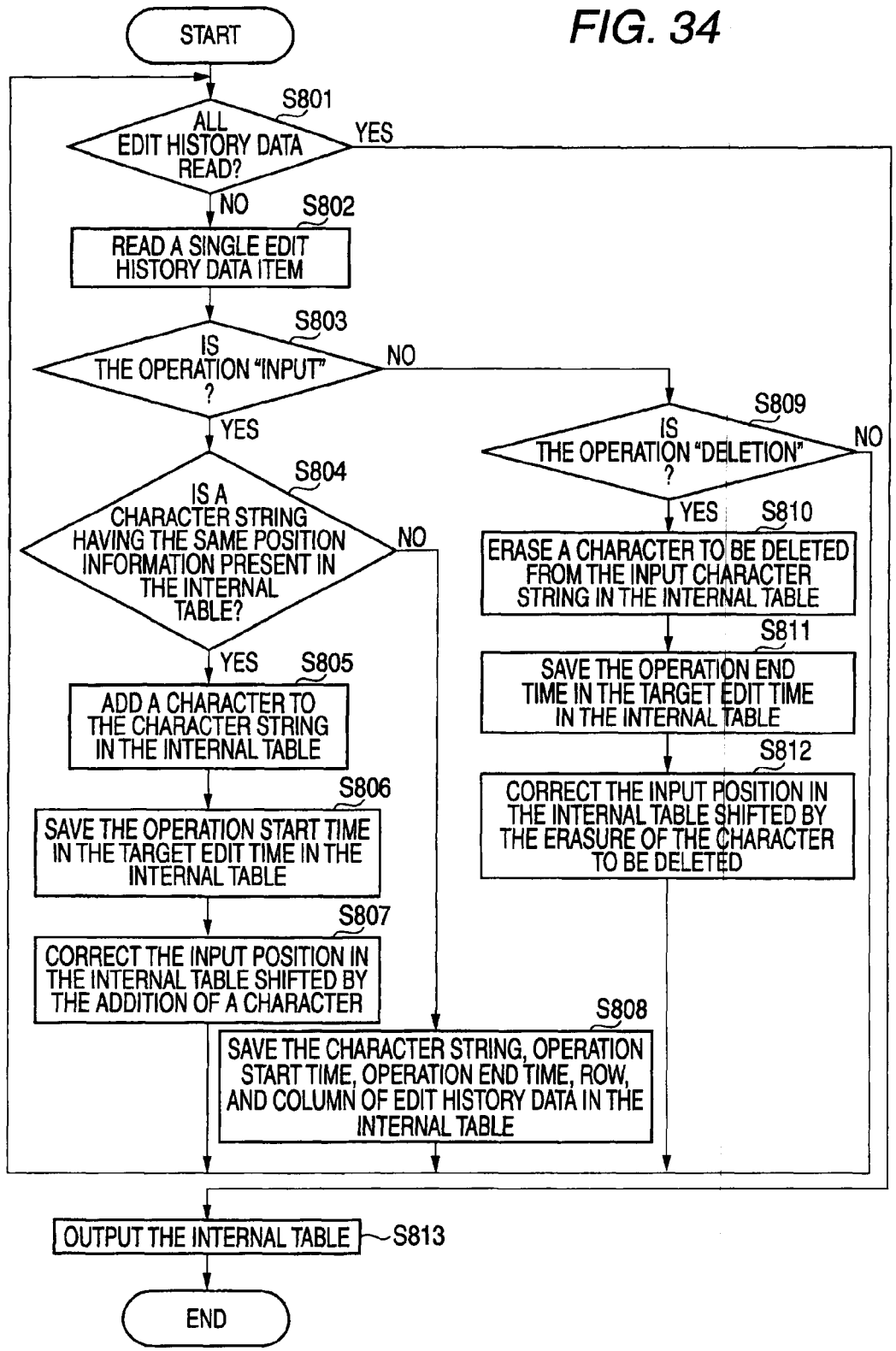
FIG. 34 It is a flowchart showing the procedure for calculating operation of the time stamp calculation section.

The time stamp calculation section 20 calculates the input start time information and input end time information, that is, time stamps for the edited memo data in units of words or phrases based on the edit history data acquired by the data acquisition section 10 (step S603). FIG. 34 is a flowchart showing the procedure for calculating operation of the time stamp calculation section 20.

First of all, the time stamp calculation section 20 determines whether all edit history data has been read (step S801). In case the data has not been read, the time stamp calculation section 20 reads a single edit history data item (step S802). Next, the time stamp calculation section 20 determines whether the "Operation" of the read edit history data is "Input" (step S803). In case the "Operation" is "Input", the time stamp calculation section 20 determines whether a character string having the same position information is present in the internal table (step S804).

In case a character string having the same position information is present in the internal table, the time stamp calculation section 20 adds the target characters of the edit history data to the target character string in the internal table (step S805), saves the operation start time in the target edit time in the internal table (step S806), and corrects the input position in the internal table shifted by the addition (step S807). In case no character strings having the same position information are present in the internal table, the time stamp calculation section 20 saves the target character string, operation start time, operation end time and information concerning the position of inputted characters (row/column information) in the internal table (step S808).

In case the operation is not "Input" in the determination in step S803, the time stamp calculation section 20 determines whether the operation is "Deletion" (step S809). In case the operation is "Deletion", the time stamp calculation section 20 erases a character to be deleted from the input character string in the internal table (step S810), saves the operation start time in the target edit time in the internal table (step S811), and corrects the input position in the internal table shifted by the deletion, same as Embodiment 1 (step S812).

In case the operation is not "Deletion" after the processing in steps S807, S808 or S812 or in the determination in step S809, execution returns to step S801 again and the similar procedure is repeated. In case all edit history data is read in step S801, the time stamp calculation section 20 outputs the internal table (step S813) to terminate the operation.

FIG. 35 is a schematic view of the data structure of output data of the time stamp calculation section 20. Data of the input start time and input end time as well as the time edit took place is extracted with respect to words that have reflected editing such as addition and deletion.

Next, in the flowchart of FIG. 28, the word-to-word relationship determination section 30 determines the word-to-word relationship of the output data of the time stamp calculation section 20 based on a predetermined condition and groups the related words into a single memo (word group) for the same cut (step S604). Various conditions may be set to determine the relationship. As an example, a method is used for determining the relationship between words based on the average number of input characters. Details of this method have been described in Embodiment 1 and will be omitted.

When word grouping is made, the information on the input start time and input end time is also integrated. FIG. 36 is a schematic view of the data structure of output data of the word-to-word relationship determination section 30. The data on the input start time and input end time is arranged with respect to word groups.

Figure 37:
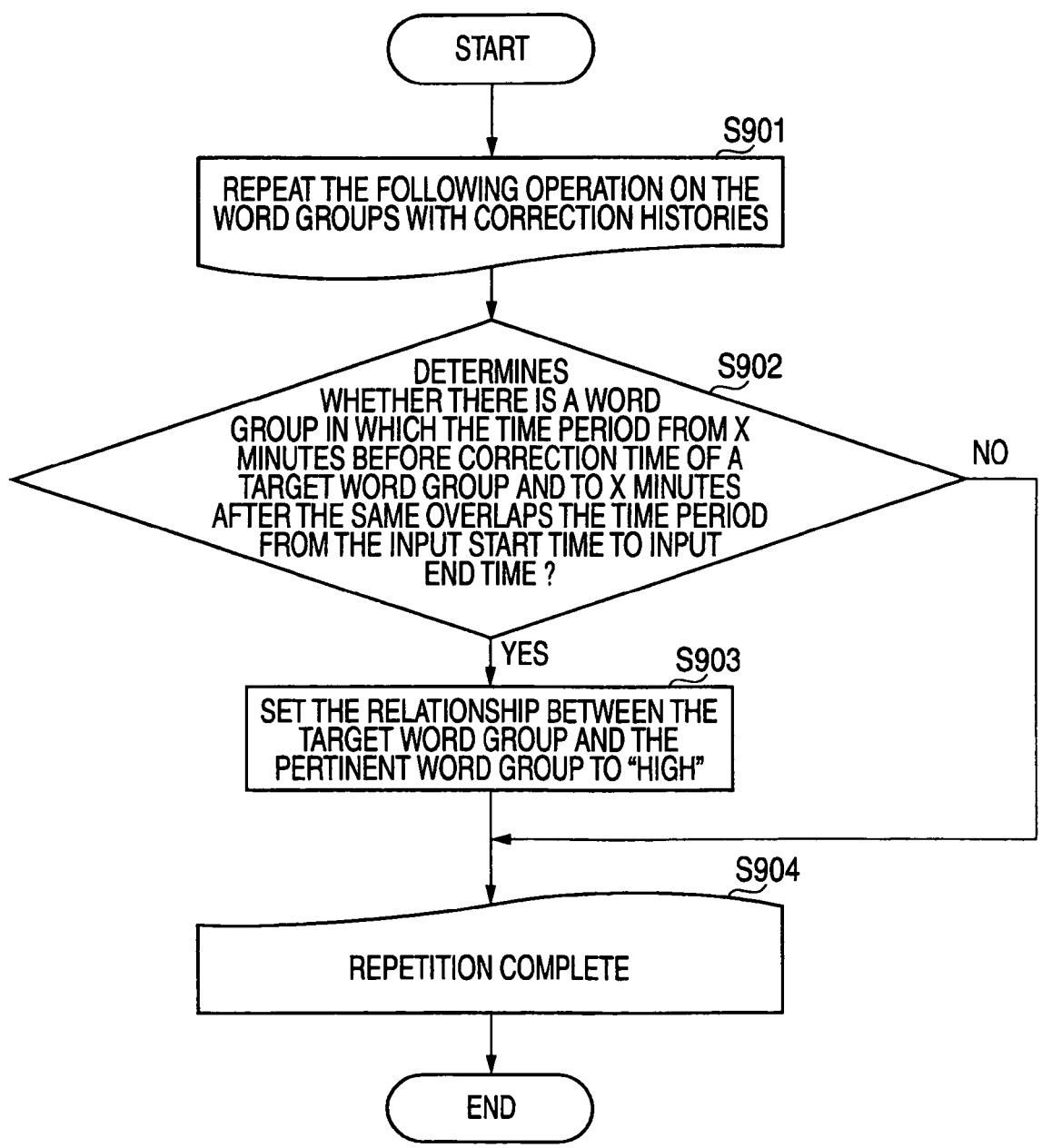
FIG. 37 It is a flowchart showing the procedure for the group-to-group relationship determination operation that is based on a correction history.

In the flowchart of FIG. 28 again, the group-to-group relationship determination section 50 determines the relationship between word groups grouped by the word-to-word relationship determination section 30 based on the correction history of metadata (step S605). FIG. 37 is a flowchart showing the procedure for the group-to-group relationship determination operation that is based on a correction history. The group-to-group relationship determination section 50 repeats the following operation on the word groups with correction histories (step S901).

First, the group-to-group relationship determination section 50 determines whether there is a word group in which the time period from X minutes before correction time of a target word group and to X minutes after the same overlaps the time period from the input start time to input end time (step S902). In case there is a pertinent word group, the group-to-group relationship determination section 50 sets the relationship between the target word group and the pertinent word group to "High" (step S903). The group-to-group relationship determination section 50 repeats determining operation from step S902 to step S903 for all word groups having correction histories (step S904). In the above description, X may be an arbitrary numeric value.

FIG. 38 is a schematic view of the data structure of output data of the group-to-group relationship determination section 50. Relationship between word groups can be grasped with the number of the character string each of the word groups related to each other. For example, the relationship "4" of the No. 1 word group "SHOSAINOYOUSU" indicates "high relationship with No. 4 word group "NARE-SHONSOU-NYUU(INSERT NARRATION)". While the relationship is "High/Low (No)" in this embodiment, relationship may be represented using a numeric value, such as assigning a larger numeric value to a largely overlapping word group in the determination in step S902 in FIG. 37. In such a case, the relationship is determined high in case an arbitrarily set threshold is exceeded.

In the flowchart of FIG. 28 again, the association determination section 40 references video material metadata (refer to FIG. 33) and memo data (refer to FIG. 38) to determine the relationship between the cut photography time or reproduction time and the word group input start time and the relationship between word groups, respectively, and then associate cuts with memo data (step S606).

Figure 39:
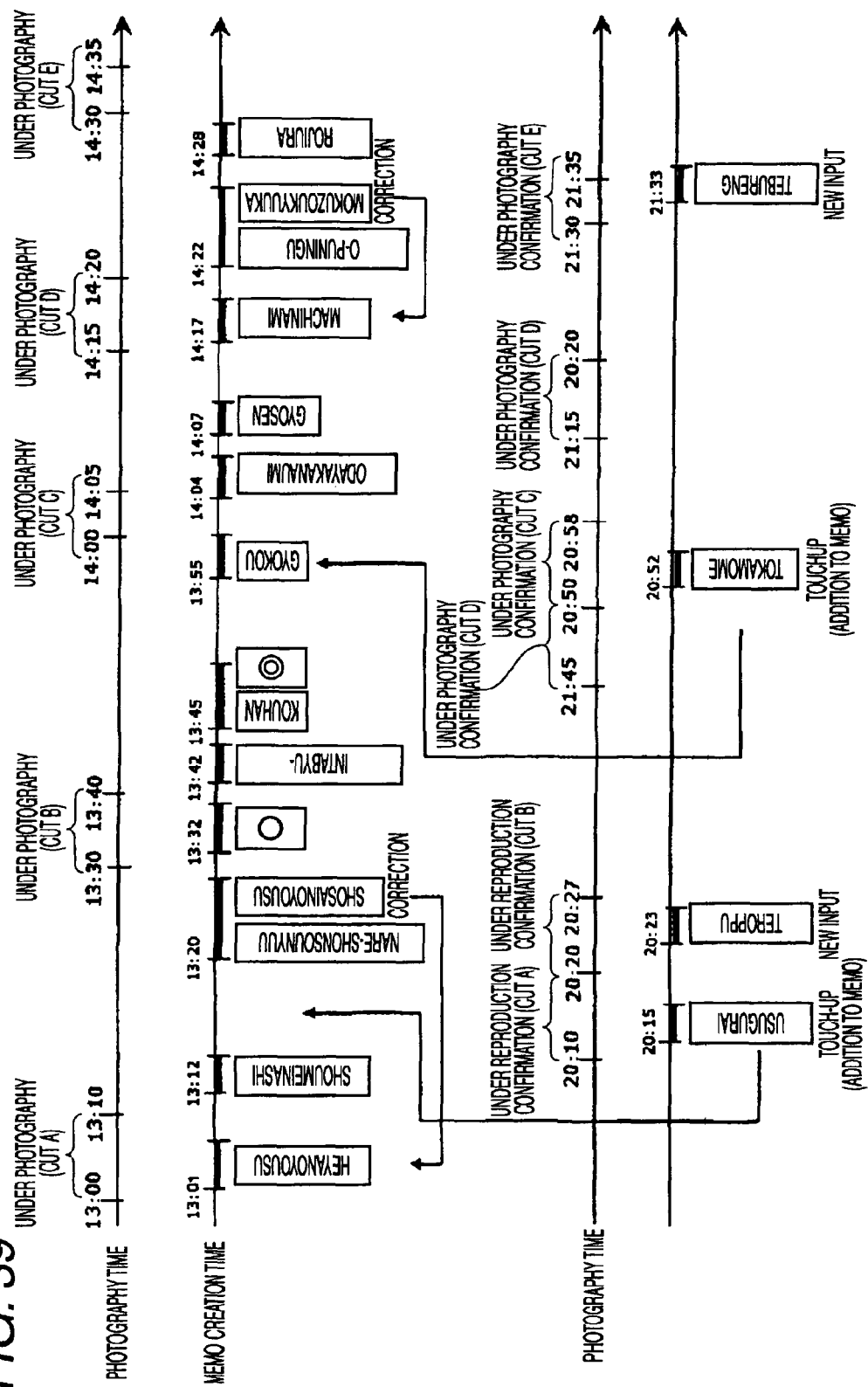
FIG. 39 It shows the relationship between the input start times of word groups and photography time or reproduction time of cuts arranged with the passage of time.

FIG. 39 shows the relationship between the input start times of word groups and photography times or reproduction times of cuts arranged with the passage of time. Relationship between particular word groups may be used for association of cuts with memo data unlike Embodiment 1, thus ensuring association with higher accuracy.

Which cut an arbitrary word group as memo data describes is determined in accordance with the following criteria according to Embodiment 1. Memo data started to be inputted during photography of an arbitrary cut is assumed as information on the cut. Memo data started to be inputted between photographic sessions of two separate cuts is assumed as information on either the first or second cut. As mentioned later, in case input is started between photographic sessions of two separate cuts, the intermediate period may be divided into two and setting may be made assuming the first time as information on the cut photographed immediately before and the second time as information on the cut photographed immediately afterward.

Figure 40:
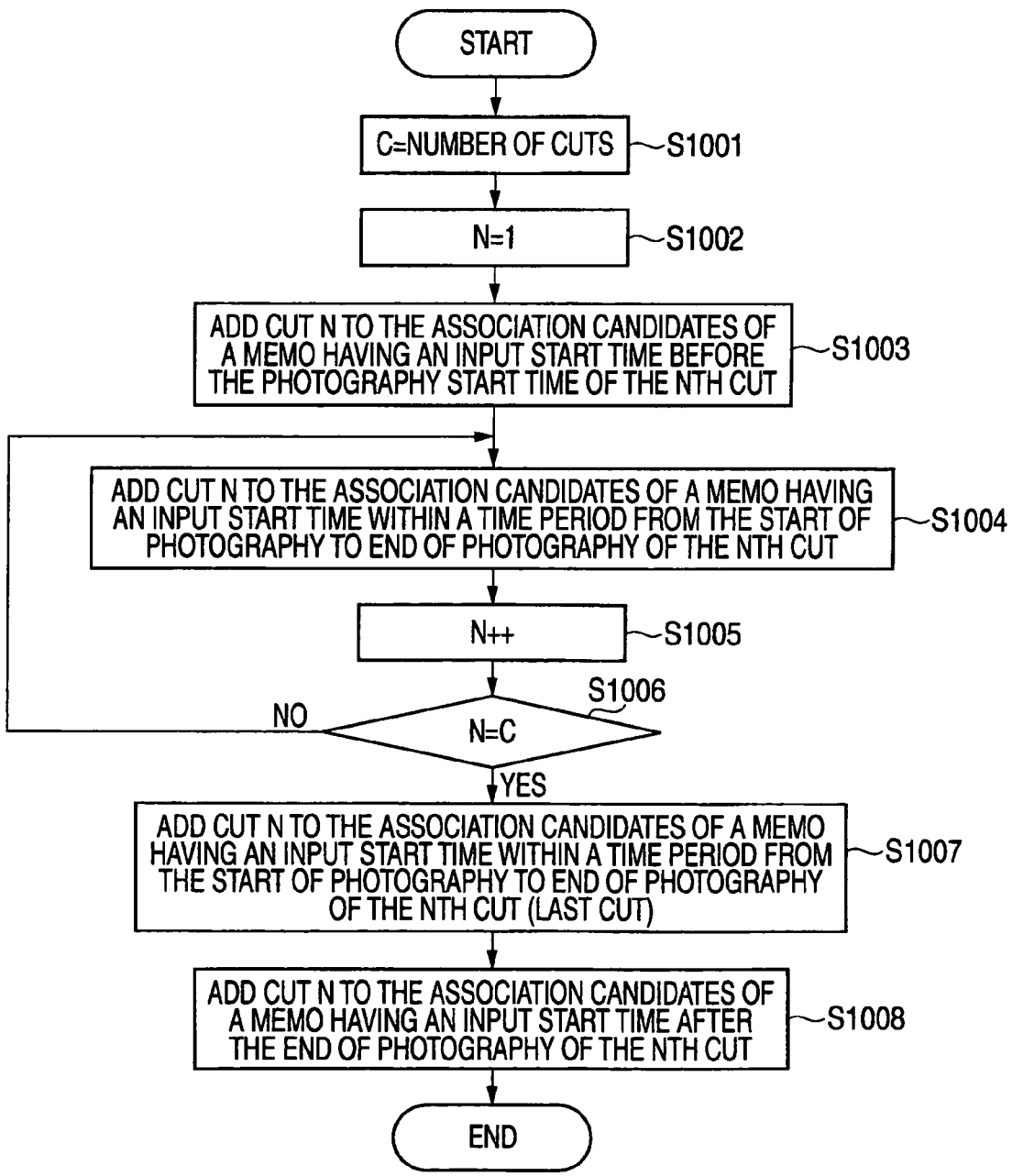
FIG. 40 It is a flowchart showing the procedure for the associating operation using the photography time information.

Next, particular operation of the association determination section 40 will be described. FIG. 40 is a flowchart showing the procedure for the associating operation using the photography time information. FIG. 41 is a schematic view of the association candidate determination result by the associating operation using the photography time information. First, initial settings of "C=Number of cuts" and "N=1" are made (steps S1001 and S1002). Next, the association determination section 40 adds Cut N to the association candidates of a memo having an input start time before the photography start time of the Nth cut (meaning the first cut since N=1) based on an assumption "there is a high probability that memo data inputted before start of photography is one concerning a cut to be photographed next" (step S1003).

Next, the association determination section 40 adds Cut N to the association candidates of a memo having an input start time within a time period from the start of photography to end of photography of the Nth cut based on an assumption "there is a high probability that memo data inputted during photography is one concerning a cut under photography" (step S1004). For example, the photography time of Cut A is from 13:00 to 13:10 (refer to FIG. 33) and the input start time of a memo "SHOSAINOYOUSU" is 13:01 (refer to FIG. 38), so that "Cut A" is added to the association candidates of the memo "SHOSAINOYOUSU" (refer to FIG. 41).

Next, the association determination section 40 increments the numeric value of N by 1 (step S1005) and determines whether the value of N has reached the value of C (step S1006).

In case the value of N has not reached the value of C (NO in step S1006), the association determination section 40 returns to step S1004 and executes the above processing on the next cut.

In case the value of N has reached the value of C (YES in step S1006), that is, the last cut is reached, the association determination section 40 adds Cut N to the association candidates of a memo having an input start time within a time period from the start to end of photography of the Nth cut (meaning the last cut in this example) based on an assumption "there is a high probability that memo data inputted during photography of the last cut is one concerning the last cut under photography" (step S1007).

Next, the association determination section 40 adds Cut N to the association candidates of a memo having an input start time after the end of photography of the Nth cut (meaning the last cut in this example) based on an assumption "there is a high probability that memo data inputted after the end of photography of the last cut is one concerning the cut photographed last" (step S1008). For example, the end time of photography of Cut E is 14:35 (refer to FIG. 33) and the input start time of the memo "USUGURAI" is 20:15 (refer to FIG. 38). Thus, "Cut E" is added to the association candidates of this memo (refer to FIG. 41).

The above procedure associates photographed cuts with inputted memo data. While the interval between photographic sessions is divided by a ratio in the above procedure, a break may be detected using another method. For example, the input intervals between memos inputted while photography is not under way may be checked and a section with the broadest interval may be assumed as a break. A memo started to be inputted between photographic sessions may be associated with two cuts photographed immediately before and immediately afterward in accordance with the aforementioned criteria.

Figure 42:
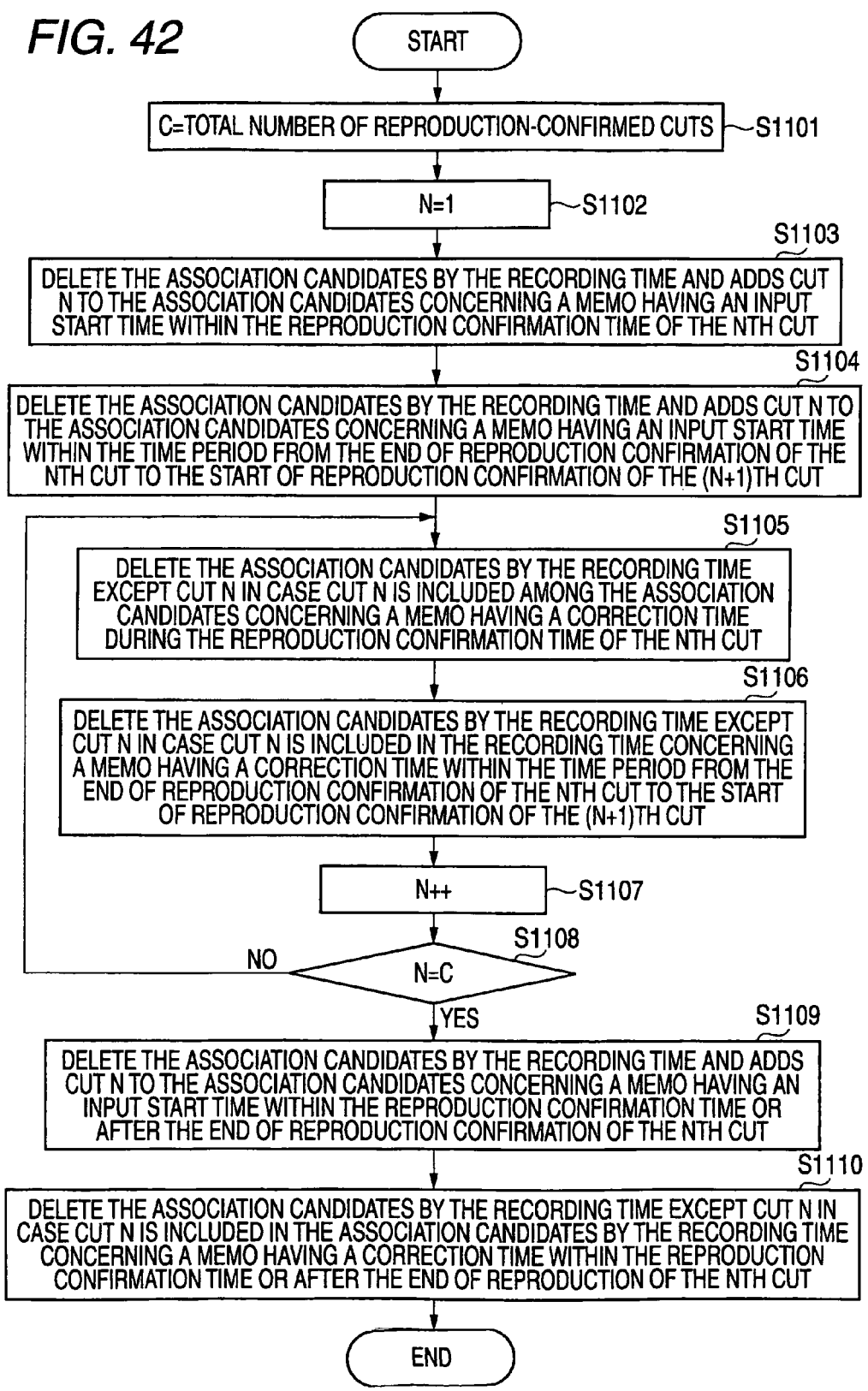
FIG. 42 It is a flowchart showing the procedure for the associating operation using the reproduction time information.

Next, associating operation using reproduction time information will be described. The associating operation may use the flowchart of the procedure for the associating operation using the reproduction time information in Embodiment 1 (refer to FIG. 23) for association and merge the association candidates using the photography time information and the association candidates using the reproduction time information. An example will be described where association with a higher accuracy is executed based on an assumption "there is a higher probability that memo data inputted during reproduction is one concerning a cut under reproduction than the result of association using the photography time information". FIG. 42 is a flowchart showing the procedure for the associating operation using the reproduction time information. First, initial settings of "C=Total number of reproduction-confirmed cuts" and "N=1" are made (steps S1101 and S1102).

Next, the association determination section 40 deletes the association candidates by the recording time and adds Cut N to the association candidates concerning a memo having an input start time within the reproduction confirmation time of the Nth cut (meaning the first cut since N=1) based on an assumption "there is a higher probability that memo data inputted during reproduction is one concerning a cut under reproduction than the result of association using the photography time" (step S1103). For example, the reproduction time of the first cut A is from 20:10 to 20:20 (refer to FIG. 33) and the input start time of the memo "USUGURAI" is 20:15 (refer to FIG. 38). Thus, "Cut E" that is an association candidate of this memo as a result of association using the photography time is deleted and "Cut A" is employed (refer to FIG. 41).

Next, the association determination section 40 deletes the association candidates by the recording time and adds Cut N to the association candidates concerning a memo having an input start time within the time period from the end of reproduction confirmation of the Nth cut (meaning the first cut since N=1) to the start of reproduction confirmation of the (N+1)th cut (meaning the second cut in a similar way) based on an assumption "there is a higher probability that memo data inputted within the time period from the end of reproduction of an arbitrary cut to the start of reproduction of a next cut is one concerning a cut reproduction-confirmed immediately before than the result of association using the photography time" (step S1104).

Next, the association determination section 40 deletes the association candidates by the recording time except Cut N in case Cut N is included among the association candidates concerning a memo having a correction time during the reproduction confirmation time of the Nth cut based on an assumption "there is a high probability that memo data corrected during reproduction is one concerning a cut under reproduction" (step S1105).

Next, the association determination section 40 deletes the association candidates by the recording time except Cut N in case Cut N is included in the recording time concerning a memo having a correction time within the time period from the end of reproduction confirmation of the Nth cut to the start of reproduction confirmation of the (N+1)th cut based on an assumption "there is a high probability that memo data corrected within the time period from the end of reproduction of an arbitrary cut to the start of reproduction of a next cut is one concerning a cut reproduced immediately before" (step S1106).

Next, the association determination section 40 increments the numeric value of N by 1 (step S1107) and determines whether the value of N has reached the value of C (step S1108).

In case the value of N has not reached the value of C (NO in step S1108), the association determination section 40 returns to step S1105 and executes the above processing on the next cut.

In case the value of N has reached the value of C (YES in step S1108), that is, the last cut is reached, the association determination section 40 deletes the association candidates by the recording time and adds Cut N to the association candidates concerning a memo having an input start time within the reproduction confirmation time or after the end of reproduction confirmation of the Nth cut (meaning the last cut) based on an assumption "there is a higher probability that memo data inputted during or after reproduction of the last cut is one concerning a cut reproduced last than the result of association using the photography time" (step S1109).

Next, the association determination section 40 deletes the association candidates by the recording time except Cut N in case Cut N is included in the association candidates by the recording time concerning a memo having a correction time within the reproduction confirmation time or after the end of reproduction of the Nth cut (meaning the last cut in this example) based on an assumption "there is a higher probability that memo data corrected during reproduction or after the end of reproduction of the last cut is one concerning the cut reproduced last than the result of association using the photography time" (step S1110).

The above procedure associates photographed cuts with inputted memo data. FIG. 43 is a schematic view of the association candidate determination result by the associating operation using the reproduction time information.

The association determination section 40 integrates the result of determination of respective candidates for "association using the photography time information" and "association using the reproduction time information" to determine association that is based on the input time of memo data. FIG. 44 is a schematic view of the association between cuts and memo data that is based on the input time of memo data.

Figure 45:
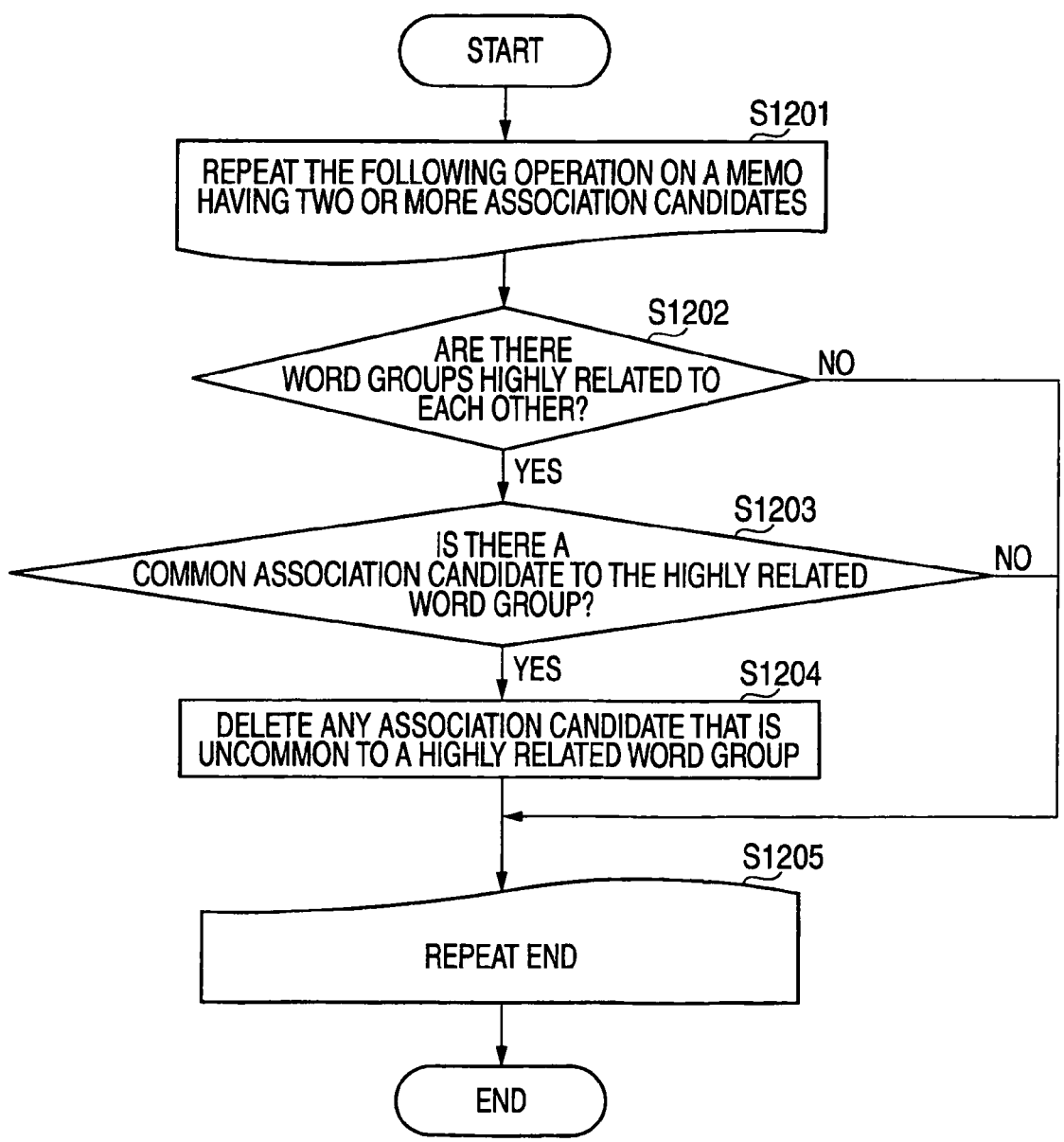
FIG. 45 It is a flowchart showing the procedure for the association operation using word group-to-word group relationship information.

Next, the association determination section 40 determines the association candidates based on the relationship between word groups. FIG. 45 is a flowchart showing the procedure for the association operation using word group-to-word group relationship information. The association determination section 40 repeats the following operation on a memo having two or more association candidates (step S1201). For example, as shown in FIG. 44, the memo "NARE-SHONSOUNYUU"

has two association candidates, Cut A and Cut B. The memo "NARE-SHONSOUNYUU" will be described as a particular example.

First, the association determination section 40 determines whether there are word groups highly related to each other (step S1202). As shown in FIG. 38, "NARE-SHONSOUNYUU" has a highly related group "SHOSAINOYOUSU". In case there exist word groups highly related to each other, the association determination section 40 determines whether there is a common association candidate to the highly related word group (step S1203). As shown in FIG. 44, the word groups "SHOSAINOYOUSU" and "NARE-SHONSOUNYUU" that are highly related to each other have Cut A as a common association candidate. In the presence of a common association candidate, the association determination section 40 deletes any association candidate that is uncommon to a highly related word group (step S1204) and leaves only a common association candidate. For "NARE-SHONSOUNYUU", the association determination section 40 deletes Cut B as an association candidate uncommon to the highly related group "SHOSAINOYOUSU" and associates Cut A as a common association candidate. The association determination section 40 repeats the determinations from step S1202 to step S1204 on all memos having two or more association candidates (step S1205).

FIG. 46 is a schematic view of the association candidate determination result using word group-to-word group relationship. As mentioned earlier, "NARE-SHONSOUNYUU" with which "Cut A and Cut B" were initially associated as a result of association of cuts with memo data in FIG. 44 that is based on the input time of memo data is now associated with "Cut A" based on the output data of the group-to-group relationship determination section 50 shown in FIG. 38. FIG. 47 is a conceptual drawing of memo data associated with cuts.

As described above, with the associating system according to this embodiment, a plurality of words are grouped as memo information on the same cut by using correction history information. It is thus possible for a memo input person to appropriately associate an initially intended memo with a video material.

Embodiment 3

Figure 48:
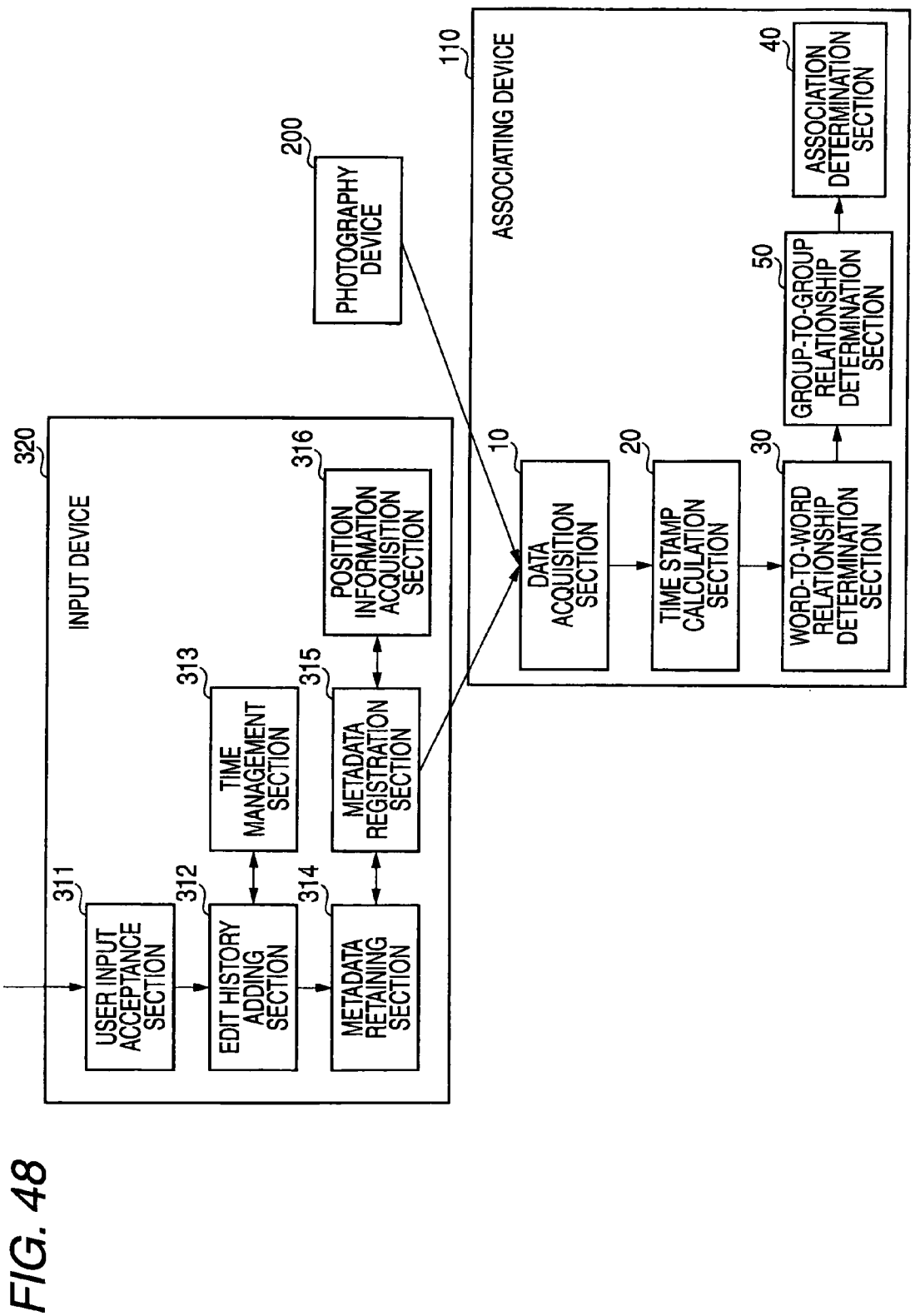
FIG. 48 It shows the outline of an associating system according to Embodiment 3 of the invention.

Next, an example will be described where the group-to-group relationship determination section 50 explained in Embodiment 2 determines the relationship between groups based on the position information from the input device 310. FIG. 48 shows the outline of an associating system according to Embodiment 3 of the invention. The associating system includes an associating device 110, a photography device 200 and an input device 320. Unlike Embodiment 2, a position information acquisition section 316 is added to the input device 320.

The position information acquisition section 316 outputs the current position information on the main body of the input device 320 in a predetermined cycle by using a GPS (Global Positioning System). The remaining internal configuration and features of each section are same as those in Embodiment 2 so that the corresponding description is omitted. The position information acquisition section may be arranged in an imaging device or provided as a separate device and attached to a director or the like.

Next, operation of the associating device in a system thus configured will be described.

Figure 49:
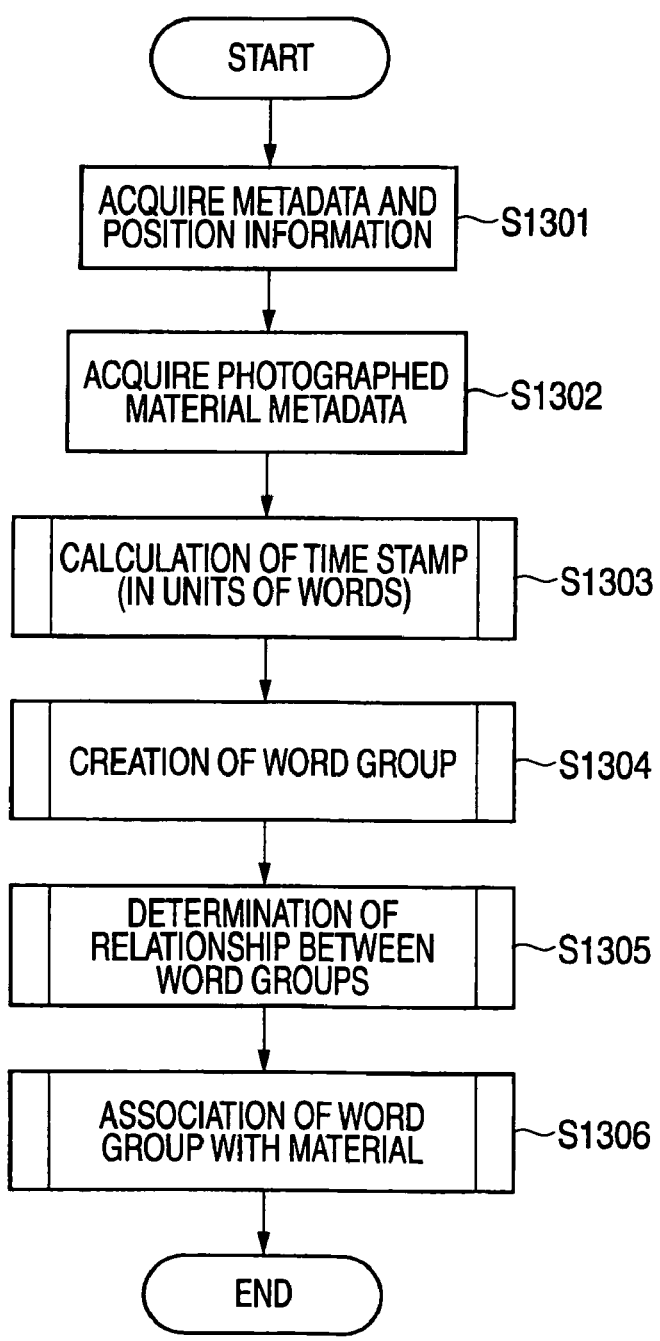
FIG. 49 It is a flowchart showing the procedure for associating operation of the associating device according to Embodiment 3 of the invention.

FIG. 49 is a flowchart showing the procedure for associating operation of the associating device according to Embodiment 3 of the invention. First, the data acquisition section 10 of the associating device 110 acquires from the input device 320 the edit history data of memo data and position information received from the GPS (step S1301). The method for acquiring edit history data is the same as that in Embodiment 2 so that the corresponding description is omitted. FIG. 50 is a schematic view of the data structure of position information acquired by the data acquisition section 10. Data concerning the latitude and longitude of the input device 320 is outputted in a predetermined cycle.

The procedure from next step S1302 to step S1304 is the same as the procedure from step S602 to step S604 in the flowchart of FIG. 28 in Embodiment 2 so that the corresponding description is omitted.

The group-to-group relationship determination section 50 determines the relationships between word groups grouped by the word-to-word relationship determination section 30 based on the correction history of metadata and position information (step S1305). Determination of the relationships between word groups that is based on the correction history is the same as that in Embodiment 2 so that the corresponding description is omitted. The following describes the determination of the relationship between groups using position information.

Figure 51:
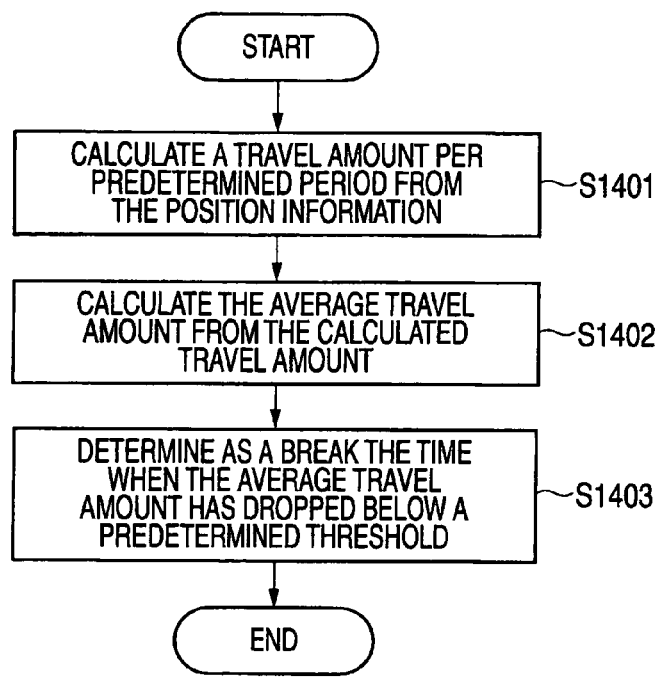
FIG. 51 It is a flowchart showing the procedure for the group-to-group relationship determination operation that is based on position information.

FIG. 51 is a flowchart showing the procedure for the group-to-group relationship determination operation that is based on position information. The group-to-group relationship determination section 50 calculates a travel amount per predetermined period from the acquired position information (step S1401). In this embodiment, the travel amount per minute is calculated assuming the predetermined period is one minute. Next, the average travel amount is calculated from the calculated travel amount (step S1402). This makes it possible to grasp whether the operator of the input device 320 is almost standing still or traveling on a vehicle or the like. For example, it is determined that memos are inputted in different locations even in case the input times of two memo data items are close to each other, it can be assumed with high probability that those two memo items are not inputted on the same cut but are memo data items inputted on separate cuts.

While the predetermined period is one minute in this example, this value may be changed.

In this embodiment, the time period of a single photographic session (from start to end of recording) in the production of a documentary program is about one minute, so that a travel amount per minute is calculated to detect whether the input device is traveling or standing still. In case a program of a genre in which a single photographic session is short is produced, the workload calculation interval should be shortened.

Next, the group-to-group relationship determination section 50 determines as a break between the states (traveling and standing still) of the input device the time when the average travel distance has dropped below a predetermined threshold (step S1403). In case the travel amount is below the threshold, the operator of the input device 320 is determined as almost standing still. In case the travel amount is above the threshold, the operator of the input device 320 is determined as traveling.

Figure 52:
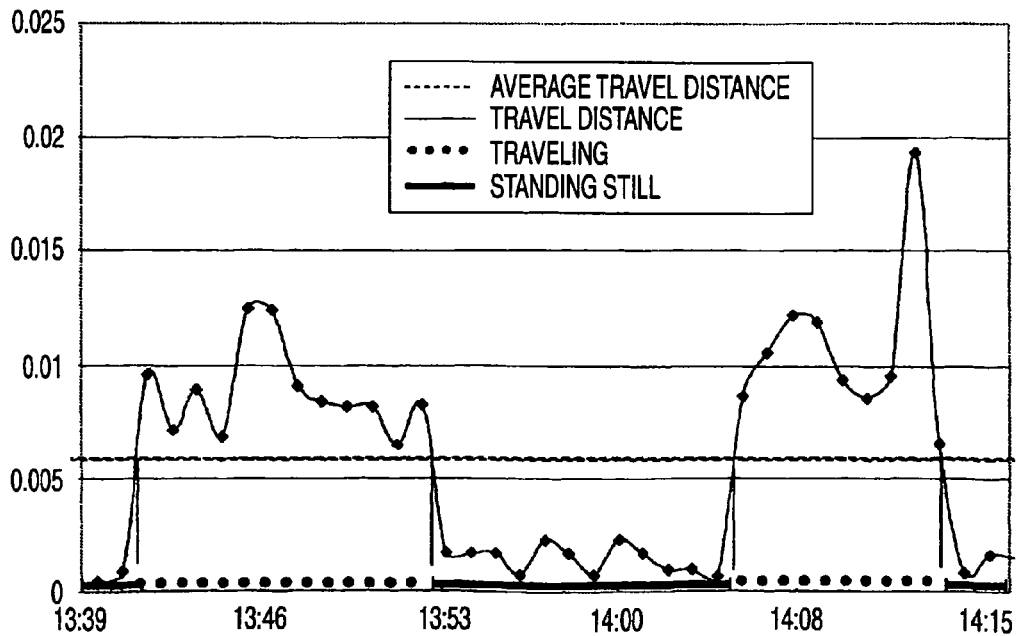
FIG. 52 It explains the situation of the group-to-group relationship determination that is based on position information.

FIG. 52 explains the situation of the group-to-group relationship determination that is based on position information. The above determination identifies whether the input device is traveling or standing still. Referring to a break between these states, it may be determined that memo data inputted while the input device is traveling has a low degree of association with memo data inputted while the input device is standing still, that is, the memo data are inputted concerning separate cuts. In a general program production process, a flow is repeated in which preparations for photography are made on a location site, photography is performed, and the crew travels to a next location site. Thus, there is a high probability that in the state of traveling, the input device is traveling between location sites. There is a high probability that the state of standing still is a time period in which preparations for photography are under way or photography is under way. There is a high probability that, in the state of traveling, the operator of the input device is writing a memo of a cut photographed immediately before. There is a high probability that, while preparations for photography are under way, the operator of the input device is writing a memo of a cut to be photographed next. In case there is a break between the state of traveling and the state of standing still while photography is not under way, there is a high probability that a memo of a cut is written before the break and a memo of another cut is written after the break.

FIG. 53 is a schematic view of the data structure of output data of the group-to-group relationship determination section 50. Word groups assumed to have lower degree of association with each other because of a positional break (different input positions) may be grasped with the number of character string of each word group. For example, No. 7 word group "KOUHAN(LAST HALF)☉" and No. 8 word group "GYOKOUTOKAMOME" have lower degree of association with each other. Note that the result of determination of relationship between word groups that is based on the correction history is omitted in this example.

Next, in the flowchart of FIG. 49 again, the association determination section 40 references the video material metadata and memo data to determine the relationship between the photography time or reproduction time of a cut and the input time of a word group and the relationship between word groups (correction history and position information) and associates a cut with memo data (step S1306).

Figure 54:
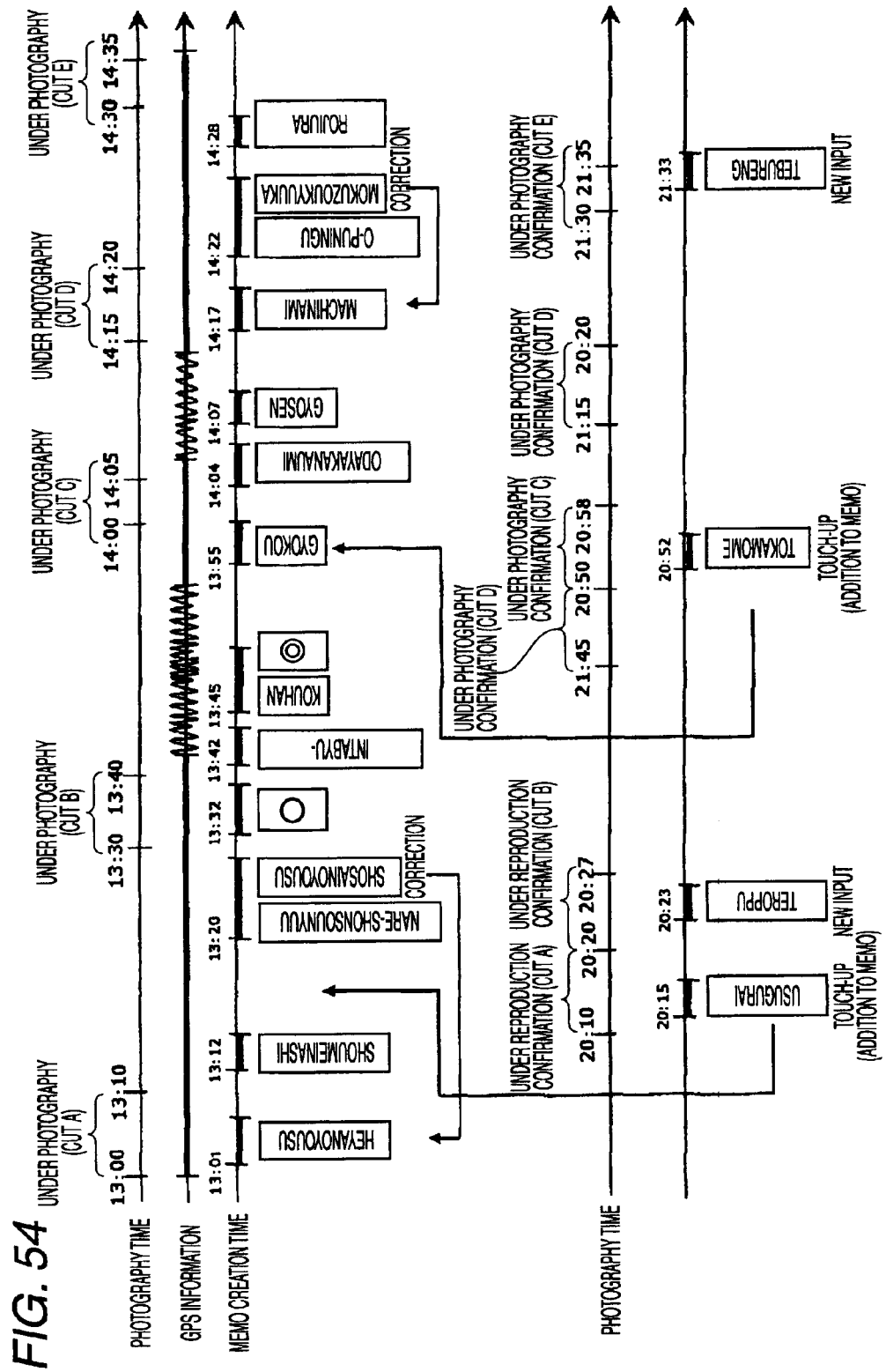
FIG. 54 It shows the relationship between the input start times of word groups and photography time or reproduction time of cuts arranged with the passage of time.

FIG. 54 shows the relationship between the input start times of word groups and photography time or reproduction time of cuts arranged with the passage of time. It can be determined that memos inputted in separate locations have lower degree of association with each other, that is, the memos pertain to separate cuts, based on the position information from the GPS. This provides association with higher accuracy than Embodiment 1. The following describes associating operation using position information among the specific determinations of the association determination section 40.

Figure 55:
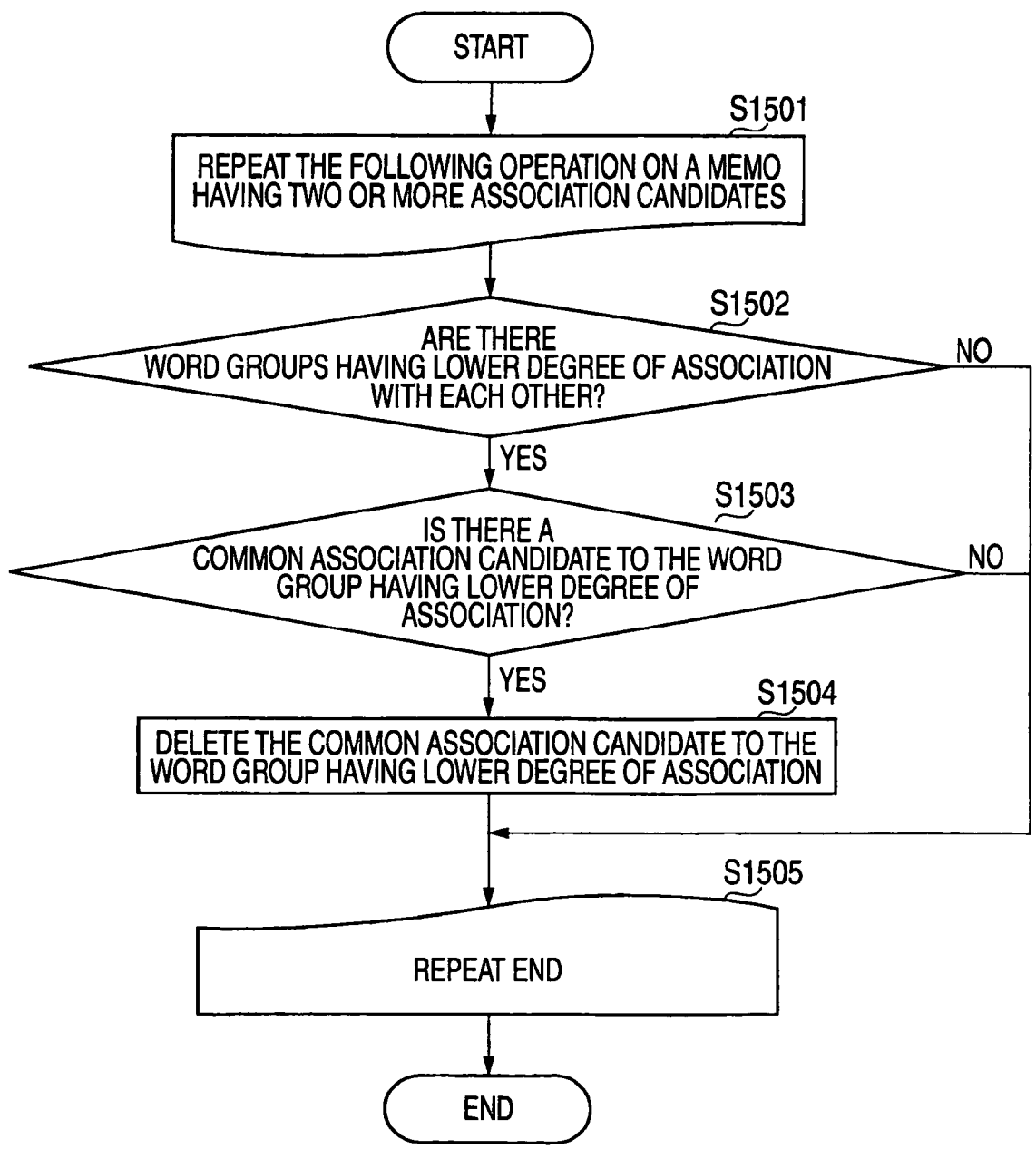
FIG. 55 It is a flowchart showing the procedure for the association operation using position information.

FIG. 55 is a flowchart showing the procedure for the association operation using position information. The association determination section 40 repeats the following operation on a memo having two or more association candidates (step S1501).

First, the association determination section 40 determines whether there are word groups having lower degree of association with each other (step S1502). In case there exist such word groups, the association determination section 40 determines whether there is a common association candidate to the word group having lower degree of association (step S1503). In case there is a common association candidate, the association determination section 40 deletes the common association candidate to the word group having lower degree of association (step S1504). The association determination section 40 repeats the determination from step S1402 to step S1404 on a memo having two or more association candidates (step S1505).

FIG. 56 is a schematic view of the association candidate determination result using word group-to-word group relationship. "KOUHAN ☉" and "GYOKOUTOKAMOME" have lower degree of association with each other and are thus determined to be memos of separate cuts. "GYOKOUTOKAMOME" with which "Cut B and Cut C" were initially associated is now associated with "Cut C". The result of determination of relationship between word groups that is based on the correction history is separately reflected. FIG. 57 is a conceptual drawing memo data associated with cuts.

As described above, with the associating system according to this embodiment, it is possible to appropriately group a plurality of words as memo information on the same cut. For example, it is possible to determine by using the position information on the input device that memo information items inputted in different locations have low degree of association with each other even in case the input times of two memo data items are close to each other.

While a memo inputted using a character input device is managed as a character string in this embodiment, the associating device of the invention can associate a target memo that is not a character string with a photographed material. For example, a memo inputted using a pen tablet or the like may be associated with a photographed material. The pen tablet refers to an input terminal capable of managing as digital data the locus handwritten by moving a dedicated pen type input terminal or the like on a tablet as a plate-shaped main body. The locus inputted within a definite or indefinite time interval is managed as input data together with the input time information per definite or indefinite time interval. By assuming each input data item as a word in this embodiment and grouping input data and associating the input data with a photographed material on the associating device of the invention, it is possible to associate a memo inputted using a pen tablet or the like with a photographed material. In this way, data inputted using any input device having a feature to manage input data and input time information may be associated with a video material.

While the invention has been described in details and in terms of its specific embodiments, those skilled in the art will recognize that various changes and modifications can be made in it without departing from the spirit and scope thereof.

This application is based on the Japanese Patent Application No. 2005-331694 filed Nov. 16, 2005 and its contents are incorporated herein as a reference.

INDUSTRIAL APPLICABILITY

The associating device according to this invention associates a word with a video material based on the input time information of a word. A word started to be inputted while a video material is being photographed is associated with the video material as a memo concerning the video material. The inputted memo information is associated with each corresponding video material when the word input person just inputs a word in the same way as handwriting without being conscious of association with the video material. It is possible to quickly retrieve a material by using a memo as a keyword. Thus, the inventive associating device is useful as an associating device for associating a plurality of acquired data items with each other.

The invention claimed is:
1. An associating device for associating a plurality of acquired data items with each other, comprising:
a non-transitory computer-readable medium having stored thereon computer-executable components, comprising:
an association determination section which associates an inputted word with a photographed video material by using input start time information on the inputted word and photography time information on the photographed video material,
wherein the input start time information indicates an actual time at which input of the inputted word begins and the photography time information indicates an actual time at which the video material is photographed.

2. The associating device according to claim 1, the non-transitory computer-readable medium, further comprising:
a word-to-word relationship determination section which determines a relationship between a plurality of inputted words to group the inputted words,
wherein the association determination section associates a grouped word group with the video material.

3. The associating device according to claim 2, the non-transitory computer-readable medium, further comprising:
a group-to-group relationship determination section which determines a relationship between the grouped word groups,
wherein the association determination section associates the grouped word group with the video material based on a determination result of the group-to-group relationship determination section.

4. The associating device according to claim 3, wherein the group-to-group relationship determination section determines the relationship between the grouped word groups by using correction history information.

5. The associating device according to claim 3, wherein the group-to-group relationship determination section determines the relationship between the grouped word groups by using position information obtained when the words are inputted.

6. The associating device according to claim 1, wherein the association determination section associates the word with the video material while referencing an operation log related to reproduction operation of the video material.

7. An associating system comprising:
the associating device according to claim 1;
an input management device for acquiring and managing the input start time of each word; and
an imaging device for photographing the video material.

8. An input management device connected to the associating device according to claim 1, wherein the input management device acquires and manages the input start time of each word.

9. The associating device according to claim 1, wherein the association determination section associates the word inputted when the video material is photographed on the photographed video material;
wherein the association determination section preferentially associates a word inputted after all of the video material have been photographed on the latest photographed video material rather than the all of the video material other than the latest photographed video material; and
wherein the association determination section preferentially associates a word inputted between photographic sessions for the video material on a video material photographed immediately before the word is inputted or immediately after the word is inputted rather than the all of the video material other than the video material photographed immediately before the word is inputted or immediately after the word is inputted.

\* \* \* \* \*